(12) United States Patent
Bryning et al.

(10) Patent No.: US 11,525,764 B2
(45) Date of Patent: Dec. 13, 2022

(54) DEVICE FOR QUANTITATIVE MEASUREMENT OF PARTICLE PROPERTIES

(71) Applicant: PepsiCo, Inc., Purchase, NY (US)

(72) Inventors: Mateusz Bryning, San Jose, CA (US); Phillip Barth, Menlo Park, CA (US); Leslie Field, Menlo Park, CA (US); Kalyan Katuri, Seattle, WA (US)

(73) Assignee: PepsiCo, Inc., Purchase, NY (US)

( * ) Notice: Subject to any disclaimer, the term of this patent is extended or adjusted under 35 U.S.C. 154(b) by 392 days.

(21) Appl. No.: 16/646,988

(22) PCT Filed: Sep. 12, 2018

(86) PCT No.: PCT/US2018/050695
§ 371 (c)(1),
(2) Date: Mar. 12, 2020

(87) PCT Pub. No.: WO2019/055532
PCT Pub. Date: Mar. 21, 2019

(65) Prior Publication Data
US 2020/0256780 A1   Aug. 13, 2020

Related U.S. Application Data

(60) Provisional application No. 62/557,585, filed on Sep. 12, 2017.

(51) Int. Cl.
*G01N 15/02* (2006.01)
*G01N 15/06* (2006.01)

(52) U.S. Cl.
CPC ......... *G01N 15/0255* (2013.01); *G01N 15/06* (2013.01)

(58) Field of Classification Search
CPC .... G01N 15/0255; G01N 15/06; G01N 13/00; G01N 15/02
See application file for complete search history.

(56) References Cited

U.S. PATENT DOCUMENTS 6,263,725 B1    7/2001 Garver et al.
9,753,024 B2 *  9/2017 Gill .................... G01N 33/4905
(Continued)

OTHER PUBLICATIONS

International Search Report and Written Opinion for PCT application No. PCT/US2018/050695 dated Dec. 27, 2018, pp. all.
(Continued)

*Primary Examiner* — David Z Huang
(74) *Attorney, Agent, or Firm* — Barnes & Thornburg LLP; G. Peter Nichols

(57) ABSTRACT

The present disclosure relates to devices, systems, and methods for quantitative measurements of colloid properties with a depletion force sensor. An example system of the present disclosure may include a well, a mass, a sensor, and a processor. The well may be contain a test fluid. The mass has a surface which may be immersed in the test fluid during operation. The sensor may include a sensing element which may be immersed in the test fluid during operation. The sensing element may include a sensor face separated from the surface of the mass by a gap. The sensor may measure a force on the sensing element relative to the mass. The processor may be coupled to the sensor and may determine properties of the test fluid based on the force.

21 Claims, 12 Drawing Sheets

(56) References Cited

U.S. PATENT DOCUMENTS

2004/0229302 A1   11/2004   Abel et al.
2008/0121026 A1    5/2008   Verdegan
2008/0282781 A1   11/2008   Hemblade
2014/0051107 A1    2/2014   Babcock et al.

OTHER PUBLICATIONS

Asakura, Sho et al., "Interaction Between Particles Suspended in Solutions of Macromolecules", Journal of Polymer Science, vol. 33, Dec. 1958 pp. 183-192.

Fleming, Andrew J., "A Review of Nanometer Resolution Position Sensors: Operation and Performance", Sensors and Actuators A: Physical, vol. 190, Feb. 2013, pp. 106-126.

Marenduzzo, Davide et al., "The Depletion Attraction: An Under-appreciated Force Driving Cellular Organization", The Journal of Cell Biology, vol. 175, No. 5, Dec. 4, 2006, pp. 681-686.

Mravlak, Marko, "Depletion Force", University of Ljubljana Department of Physics, Seminar, May 21, 2008, 20 pages.

Yodh, A.G. et al., "Entropically Driven Self-Assembly and Interaction in Suspension", The Royal Society, University of Pennsylvania, Department of Physics and Astronomy, May 2001, pp. 921-937.

Search Report dated Apr. 30, 2021 in European Application No. 18855600.5.

\* cited by examiner

DEVICE FOR QUANTITATIVE MEASUREMENT OF PARTICLE PROPERTIES

CROSS REFERENCE TO RELATED APPLICATIONS

This application is a U.S. National Stage application of PCT Application No. PCT/US2018/050695 filed Sep. 12, 2018, which claims the benefit of U.S. Provisional Application No. 62/557,585, filed Sep. 12, 2017, which are incorporated by reference herein, in their entirety, for any purpose.

BACKGROUND

Many fluids of interest may be colloids, where one or more different types of particles are suspended in the fluid. For example, emulsions generally include particles (e.g., droplets) of one liquid in another liquid. The droplets may not be soluble in the liquid. Emulsions may be used, for example, in beverages, dressings, paint, or other liquid products. Other colloids may include other types of particles, such as solids. The colloids may be characterized, for example, by a size and concentration of the particles which are suspended in the fluid.

Unless otherwise indicated herein, the materials described in this section are not prior art to the claims in this application and are not admitted to be prior art by inclusion in this section.

SUMMARY

In at least one aspect, the present disclosure may relate to a microfabricated system. The microfabricated system may include a well, a mass, a sensor, and a processor. The well may contain a test fluid. The mass has a surface which may be immersed in the test fluid during operation. The sensor may include a sensing element which may be immersed in the test fluid during operation. The sensing element may include a sensor face separated from the surface of the mass by a gap. The sensor may measure a force on the sensing element relative to the mass. The processor may be coupled to the sensor and may determine properties of the test fluid based on the force.

In at least one aspect, the present disclosure may relate to a device. The device may include a well, a mass, a sensing element, an actuator, and a sensor. The well may hold a test fluid. The mass may be partially positioned in the well and may include a surface configured for contact with the test fluid. The sensing element may have sensor face which is positionable at a distance from the surface. The actuator may be positioned outside the well, and may be coupled to a portion of the mass positioned outside of the well. The actuator may move the mass to change the distance between the sensor face and the surface of the mass. The sensor may be positioned outside the well, the sensor coupled to the sensor tip to determine a force towards the surface of the mass.

In at least one aspect, the present disclosure may relate to a device which may include a stationary mass, a fluctuating element, and a sensor. The stationary mass may be positioned in a test fluid. The fluctuating element may be positioned in the test fluid and may at least partially define an opening. The stationary mass may be disposed in the opening. The sensor may be coupled to the stationary mass and the fluctuating element and may measure a distance between the stationary mass and the fluctuating element.

In at least one aspect, the present disclosure may relate to a method. The method may include measuring a depletion force induced by particles in a fluid by a sensor. The method may also include determining, using at least one processing unit, at least one of a size, concentration, or distribution of the particles based on the measured depletion force.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several examples in accordance with the disclosure and are, therefore, not to be considered limiting of its scope, the disclosure will be described with additional specificity and detail through use of the accompanying drawings, in which:

DETAILED DESCRIPTION

Figure 1:
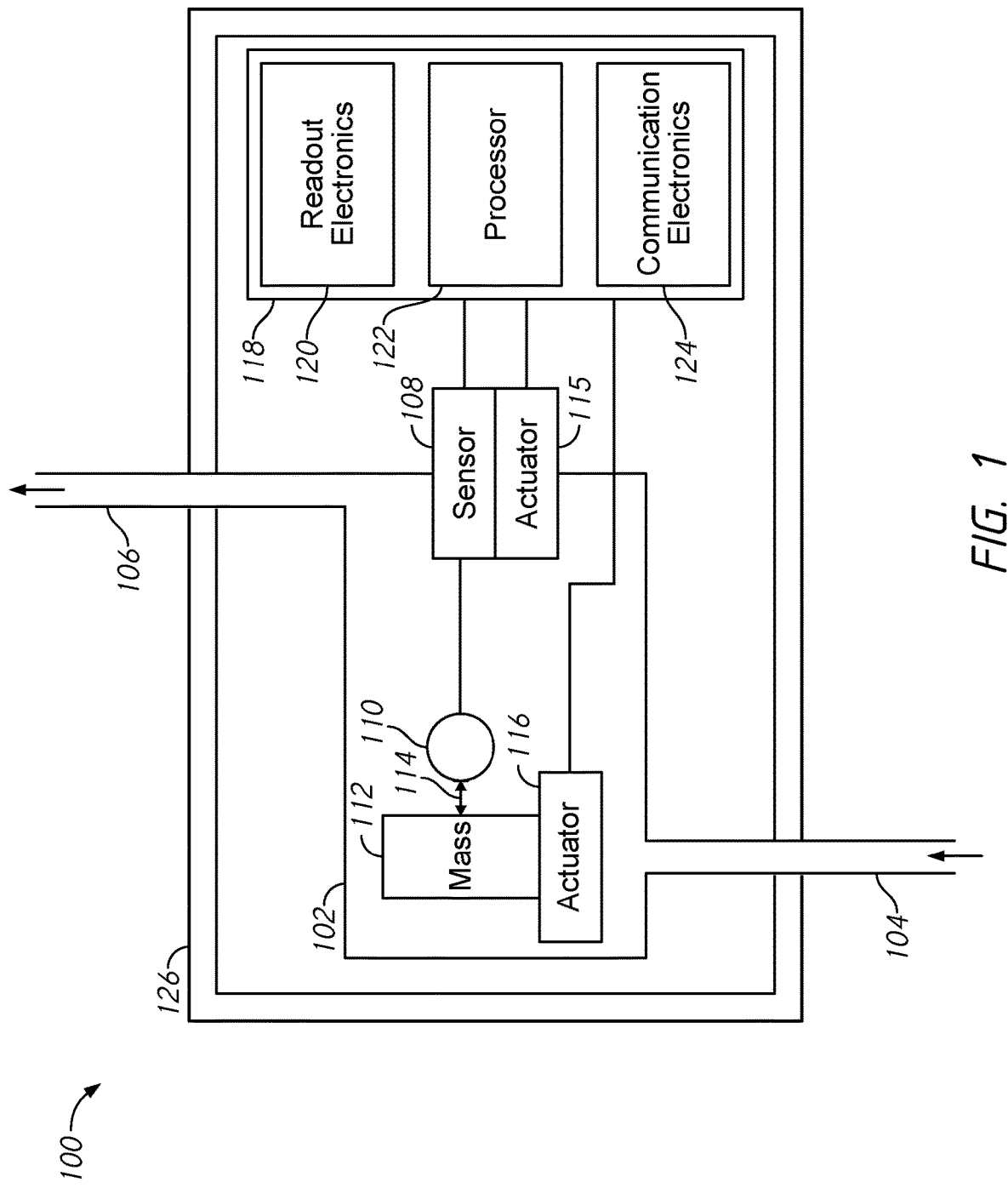
FIG. 1 is a schematic diagram of a depletion force measurement system, arranged in accordance with at least some embodiments described herein.

In the following detailed description, reference is made to the accompanying drawings, which form a part hereof. In the drawings, similar symbols typically identify similar components, unless context dictates otherwise. The illustrative examples described in the detailed description, drawings, and claims are not meant to be limiting. Other examples may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are implicitly contemplated herein.

A variety of different types of colloids may be of interest for a variety of different applications. It may be desirable to characterize emulsions in order to, for example, ensure uniformity and size of the particles within the fluid. It may be desirable to determine if the particles fall within a target concentration range. For example, measurement of particles in a biological fluid (which may contain solid particles such as proteins and/or liquid particles such as fats) may be used to make a diagnosis and/or monitor a course of treatment. In another example where an emulsion such as a flavored beverage (which may contain particles such as water insoluble flavorings) is being produced, it may be desired to monitor the emulsion and change one or more aspects of the production based on the characterized emulsion. For example, if the flavoring particles in the beverage fall below a target concentration, additional particles may be introduced to the emulsion.

The present disclosure includes examples of devices and/or systems including a sensor that can obtain quantitative measurements of particle size and concentration in a test fluid and may be adapted to in-line sensing. The sensor may operate on the principle of (colloidal) depletion force, an effective attractive force that arises between objects that are in close proximity to each other due to asymmetrical pressures exerted on the objects by microscopic particles (e.g., "depletants") that surround the objects. Example microfabricated systems and devices are described herein that may be fabricated specifically for this purpose.

In certain embodiments of the present disclosure the results of the sensor may be used to produce one or more actions (such as adjusting a concentration of particles in the test fluid). The device may directly take such actions and/or a coupled system may take actions based on measurements provided by the device.

While the examples described herein are not limited or constrained by any particular theory, some theory of possible operation is described herein to facilitate appreciation of the technical subject matter. Generally, when two objects are brought into close proximity to each other in a dispersion of small particles (e.g., depletants), an effective attractive force results when the depletants can no longer fit in the space between the two objects. The depletion force may be equivalently described in terms of asymmetric Brownian forces acting on the exterior sides of the objects, which are not counterbalanced in regions that exclude the depletants, or in terms of entropy—maximizing the volume accessible to micelles by minimizing inaccessible volumes, or in terms of osmotic effects. Regardless of the physical description, the effective attractive force may be readily measurable and can be related to micelle size and concentration via the Asakura-Oosawa model.

FIG. 1 is a schematic diagram of a depletion force measurement system, arranged in accordance with at least some embodiments described herein. The depletion force measurement system may include a device 100 which includes a well 102, an inlet 104, an outlet 106, a sensor 108, a sensing element 110, a mass 112, a gap 114, actuators 115 and 116, a computing system 118, readout electronics 120, processor 122, communication electronics 124, and enclosure 126. The various components described in FIG. 1 are merely examples, and other variations, including eliminating components, combining components, and substituting components are all contemplated.

The device 100 includes a well 102 which is fluidly coupled to an inlet 104 and an outlet 106. One or more test fluids may be introduced to the well 102 through the inlet 104 and/or removed via the outlet 106 such that the device 100 may be 'in-line' with a fluid source. The system also includes a sensor 108 with a sensing element 110. The sensing element 110 may be positioned in the well 102 a distance away from a mass 112, such that there is a gap 114 between the mass 112 and the sensing element 110. Actuator 115 may be coupled to the sensor 108 and/or actuator 116 may be coupled to mass 112 to selectively vary the size of the gap 114. The sensor 108 may measure a force acting on the sensing element 110 towards the mass 112. The sensor 108 and/or actuators 115, 116 may be coupled to a computing system 118. The computing system 118 may include readout electronics 120 to process signals to/from the sensor 108 and/or actuators 115, 116, a processor 122 to determine properties of the fluid based on the signals, and communications electronics 124 to provide the determined properties off of the device 100. One or more components of the device 100 may be positioned in an enclosure 126.

The device 100 may be configured to operate on a test fluid containing particles. The test fluid may be an emulsion, or other related fluids (e.g., a reverse emulsion, microemulsion, etc.). The test fluid may be a suspension of nanoparticles and/or microparticles which may be monodispersed or polydispersed. The test fluid may be a complex fluid, which may include particle aggregates, flocculates, supramolecular assemblies, bicontinuous structures and/or a broad range of other nano- and/or micro-scale structures. The particles may have various shapes which may include features which are spherical, crystalline, quasi-crystalline, amorphous, rod-like, dendritic, fibrous, etc. The test fluid may be a biological fluid, which may contain a mix of solid and liquid particles. The particles may include one or more living organisms such as bacteria, protozoa, plankton, etc. The test fluid may be a colloidal dispersion. In some embodiments the test fluid may be a mixture of one or more of the types of test fluids listed above. The particles may be on the size scale of roughly 1 nm to 1 mm. The test fluid may be concentrated, and may be at least partially opaque to light.

The well 102 contains the test fluid in a specific region of the device 100. The well 102 may be a physical structure such as a microfluidic channel or a microwell. The well 102 may be formed by coating a region of a surface. For example, if the test fluid is an aqueous solution, a hydrophilic coating may be used to contain the fluid on a given region. The well 102 may also be at least partially defined by a coating which rejects the fluid, for example by coating an area of the surface outside of the well 102 with a hydrophobic coating. In some embodiments, both types of coating may be used in different regions of the system. In some embodiments, the well 102 may be bounded by a combination of physical structures and coatings (and coated physical structures). The well 102 may be fabricated onto and/or into a silicon wafer.

Substances which may be characterized using the device 100 described herein include, but are not limited to, beverages, foods, paints, biological samples (e.g., blood and other fluids, prepared samples like protein or DNA suspensions, bacteria/virus suspensions, etc.), water (e.g., in a sewage treatment context, etc.), cosmetics, automotive and aerospace (e.g., fuel, lubricants, coolant fluid, etc.), soil monitoring, nanoparticle production for various applications, oil refineries, consumer uses (e.g., cooking, dishwasher or washing machine sensors, etc.).

The well 102 may be closed off from, or open to an ambient environment. For example, the well 102 may be open to the air or to a bulk supply of the test fluid. In some cases, the well 102 may be at least partially surrounded by a fluid (and/or other substance) which is immiscible with the test fluid. Certain components of the device 100 (as shown in the example of device 100, sensor 108) may extend across a boundary between the immiscible fluid and the test fluid. In some examples, the well may be at least partially surrounded by a physical barrier and at least partially surrounded by an immiscible fluid.

The well 102 may be fluidly coupled to an inlet 104 and/or an outlet 106. The inlet may receive a test fluid and provide it to the well 102, while the outlet 106 may drain the well 102. In some embodiments, the inlet 104 may be coupled to a source of the test fluid such that the device 100 is 'in-line' with a process (e.g., production) that the test fluid is undergoing. The outlet 106 may also be coupled in-line with the fluid, or may be coupled to a sink, such as a disposal for the test fluid. In some embodiments, the well 102 may be selectively coupled to the inlet 104 and/or outlet 106 (e.g., by valves) to control the flow of test fluid into/out of the well 102. In some embodiments, the inlet 104 and outlet 106 may be the same physical structure.

The well 102 may be coupled to a mechanism for delivering the test fluid into (and/or removing the test fluid from) the well 102. For example, the system may include a microfluidic system including microfluidic channels, pumps, valves, etc., a microdispenser which may directly dispense the test fluid to the well 102, and/or a channel which passively transports the fluid (e.g., with capillary force). In some embodiments the mechanism for delivering the fluid may be a manual fluid delivery mechanism, such as a pipette or syringe. In some embodiments, the mechanism may be a part of the same structure (e.g., a silicon or glass wafer) which includes the well 102. The mechanism may also include external components coupled to the inlet 104 and/or outlet 106 such as pumps, actuators, fluidic connectors, tubing, etc.

The sensor 108 may be positioned such that a sensing element 110 is in contact with the test fluid. The sensing element 110 may be any part of the sensor 108 which is positioned such that it experiences a depletion force. The sensing element 110 may include a first surface (a sensor face) which faces the gap 114 between the sensing element 110 and the mass 112. The sensing element 110 may also include a second surface which does not face the gap 114. Both the first and second surface may be in contact with the test fluid. Based on the size of the gap 114, the second surface may experience forces from the particles that the first surface does not, which may generate a depletion force acting on the sensing element 110. The sensing element may 110 may be positioned in the well 102, and may be immersed in the test fluid when the well 102 contains the test fluid. In some embodiments, the sensing element may be a membrane.

The surfaces of the sensing component may be coated, treated, and/or functionalized. For example, the surfaces of the sensing element 110 may be treated to improve wall smoothness, compatibility with the test fluid, and/or enable measurement of specific fluid properties, such as surface activity. The sensing element 110 may be shaped, for example to increase the surface area of the first and/or second surfaces. The sensing element 110 may be coupled to the rest of the sensor 108 by a beam or other connective member.

The sensor 108 may include a measurement mechanism coupled to the sensing element 110. In some embodiments, all or part of the measurement mechanism may be positioned in the well 102. In some embodiments, the measurement mechanism may be positioned outside of the well 102, and sensing element may extend into the well 102 (e.g., on the end of an arm coupling the sensing element 110 and the measurement mechanism). The sensor 108 may measure the force on the sensing element 110, a displacement of the sensing element 110, and/or a deflection of the sensing element 110. In some embodiments, the sensor 108 may measure a force (or deflection/displacement) acting on the sensing element in a direction towards the mass 112. The measurement mechanism may be one or more of electrostatic, piezoelectric, piezoresistive, optical, and/or magnetic.

The mass 112 may have a surface which is in contact with the fluid, and positioned across a gap 114 from a face of the sensing element 110. The mass 112 may be positioned in the well 102. In some embodiments, only a portion of the mass is positioned in the well 102. The mass 112 may have a mass which is much greater than the mass of the sensing element 110 and/or be coupled to fixed components of the device 100. Accordingly, the mass may undergo negligible deflection due to the depletion force. In some embodiments, the mass 112 may be a wall. In some embodiments, the mass 112 may be one of the surfaces which defines the well 102. One or more surfaces of the mass may be coated, treated, and/or functionalized in a manner similar to the surface(s) of the sensing element.

A first surface of the sensing element 110 (the sensor face) and a surface of the mass 112 may be separated by a gap 114. The size of the gap 114 may be determined by the desired size range of particles that the sensor 108 is designed to measure. The gap 114 may either be a defined gap or a fluctuating gap. In embodiments with a defined gap, the size of the gap 114 may be known and/or measured. In some embodiments, the size of gap 114 may be known due to the fabrication of the device 100. In some embodiments, the size of the gap 114 may be selectively variable. Either the mass 112 and/or the sensor 108 may be coupled to an actuator which may displace the mass 112 and/or sensor 108 to change the size of the gap 114. As shown, the sensor 108 is coupled to actuator 115, and the mass 112 is coupled to actuator 116. However, it is to be understood that in some embodiments only one of the sensor 108 or the mass 112 may be coupled to an actuator, and in some embodiments neither may be coupled to an actuator. The actuators 115, 116 may include a mechanism for sensing the nominal size of the gap 114. The actuators 115, 116 may be electrostatic, thermal, and/or piezoelectric. In some embodiments, the actuators 115, 116 may be positioned inside the well 102, outside of the well 102, or partially inside and outside the well 102. An example embodiment with a selectively variable gap is described in more detail in FIGS. 6-8.

In some embodiments, the device 100 may perform a measurement at multiple different sizes of the gap 114. Since the depletion force may be dependent on an interaction between the size of the particles and the size of the gap 114, by varying the gap 114 a wider range of particle properties may be determined. In embodiments where the gap 114 is selectively variable, a measurement may be taken at a given size of the gap 114, and then the mass 112 and/or sensor 108 may be moved and another measurement collected. In some embodiments, a plurality of sensors may be provided, each of which is separated from a mass by a different size of gap. An example embodiment with multiple sensors, each with a different gap size, is described in more detail in FIG. 9.

In embodiments with a fluctuating gap, the size of the gap 114 may be allowed to vary over time. For example, the sensing element 110 may be a fluctuating element suspended in a fluid and allowed to have a range of motion along one or more axis. The sensing element 110 may be constrained such that it moves about (or near) a stationary mass 112. The sensing element 110 may move such that it varies the distance between the sensing element 110 and the mass 112. The sensor 108 may determine the forces acting on the sensing element 110 over time as the gap 114 fluctuates. In some embodiments with a fluctuating gap, motion of the fluctuating element may be induced, for example the test fluid surrounding the sensing element 110 may be moved (e.g., by pumps) to cause the sensing element 110 to move relative to the mass. In some embodiments an oscillating flow may be induced in the test fluid. An example embodiment with a fluctuating gap is described in more detail in FIG. 10.

The sensor 108 may produce a signal which is proportional to a depletion force acting on the sensing element 110. The magnitude of the depletion force may depend on particle size and concentration as well as the size of the gap 114. As an example of the relationship between these properties, for monodispersed particles between parallel plates, the depletion force per unit area may be expressed by Equation 1, below:

$$F/A = -(N/V) * kB * T * (\text{Theta})(2Rs - h) \qquad \text{Eqn. 1}$$

where N/V is the number density of the particles in the test fluid, kB is the Boltzmann constant, T is the temperature of the test fluid, Theta is the Heaviside function, Rs is the radius of the particles, and h is the gap size. In a test fluid with more complicated geometries (e.g., non-parallel plates) and/or particles (e.g., polydisperse), the relationship between force, particle size, and gap size may be more complicated. In some embodiments it may be unnecessary to determine an analytical relationship between these factors, and one or more empirical relationships (e.g., as determined by curve fitting, machine learning, etc.) may be used instead.

Multiple forces may act upon the sensor 108 and sensing element 110. Some of these forces (e.g., the depletion force) may depend on the gap 114 and/or mass 112. Other forces (e.g., thermal fluctuations, fluid flow, etc.) may be independent of the gap 114 and/or mass 112. The device 100 may include a reference sensor (not shown in FIG. 1), which may be positioned such that a reference sensing element of the reference sensor is not influenced by the gap 114 and the mass 112. The reference sensor may be physically identical to the sensor 108. The device 100 may compare measurements from the sensor 108 and from the reference sensor to cancel out the influence of forces which are independent of the gap 114 and the mass 112.

In some embodiments, the device 100 may include a plurality of sensors such as an array of sensors. Each of the sensors may the same or one or more of the sensors may be different from each other. The multiple sensors may, for example, increase a magnitude of the signal provided to the computing system 118. In some embodiments, the mass 112 may be a second sensor with a second sensing element, similar to the sensor 108 and sensing element 110. The gap 114 may then be between the sensing element 110 and the second sensing element, and the computing system 118 may receive a signal from both the sensor 108 and the second sensor.

The sensor(s) 108 and the actuators 115, 116 may be coupled to a computing system 118. The computing system 118 may be positioned on the same chip or structure as the well 102, or may be separate component. The computing system 118 includes readout electronics 120, which may be used for acquisition and pre-processing of signals sent to and/or received from the sensor 108 and actuators 115, 116. The readout electronics 120 may include one or more of filter circuits, preamplifier circuits, signal shaper circuits, threshold circuits, analog-to-digital conversion circuits, digital-to-analog conversion circuits, and/or memory circuits. The computing system 118 may be a component of the device 100, or the device 100 may be coupled to an external computing system 118. In some embodiments, certain components of the computing system 118 (e.g., the readout electronics 120) may be part of the device 100, while other components (e.g., the processor 122 and communications electronics 124) are external.

The readout electronics 120 may provide the signals to a processor 122 which may determine one or more properties of the particles based on signals from the sensor 108. For example, the processor 122 may operate in conjunction with software (e.g., the processor 122 may execute instructions stored in one or more computer readable media accessible to the processor 122). While illustrated as a single processor 122, in some examples, the processor 122 may be implemented by one or more processing units, including one or more processors, processor cores, controllers, microcontrollers, and/or custom circuitry (e.g., application specific integrated circuit (ASIC) and/or field programmable gate array (FPGA)). The processor 122 may determine one or more properties of the particles using the sensor signals. Properties which may be determined include, but are not limited to, size, density, or concentration of particles.

The processor 122 may direct a measurement procedure by, for example, changing a size of the gap 114 (e.g., with actuators 115 and/or 116) and collecting multiple measurements at different sizes of the gap 114. The measurements may include quasi-static or equilibrium conditions. The measurements may include non-equilibrium or transient behaviors. The measurements may include resonant mode analysis to determine resonance frequency, amplitude, and/or phase.

In some embodiments, the processor 122 may use machine learning to characterize the test fluid. For example, the processor may use a neural network, a deep neural network, and/or may employ curve fitting to a theoretical (e.g., physics based) model. In some embodiments, the machine learning may be trained on a database of raw or pre-processed sensor data from known test fluids in order to identify an unknown test fluid. In some embodiments the machine learning may be trained on pre-processed sensor data from a variety of known test fluids to generalize results and characterize the properties of an unknown test fluid.

The processor 122 may identify the test fluid by comparing determined properties of the test fluid to one or more known fluids. For example, in an application where the test fluid is being produced, the properties of the test fluid may be compared to known properties of the desired components as well as likely contaminants of the test fluid. The processor 122 may determine the identity of components, their amount, and/or other properties. In some embodiments, the processor 122 may identify the test fluid as a mix of components, and may determine their relative concentrations within the test fluid.

The processor 122 may characterize the test fluid by determining one or more properties of the test fluid. The processor 122 may characterize properties of the particles in the test fluid and/or the fluid of the test fluid. Properties of the particles that may be characterized may include one or more of polydispersity, surface charge, concentration, surface chemistry, shape, size distribution and/or size. Additional fluid (and/or particle) characteristics that may be characterized may include particle agglomeration or flocculation, fluid rheology and micro-rheology, electrical conductivity, dielectric properties, semiconducting properties, ionic strength, pH, supramolecular chemistry, covalent and non-covalent particle interactions, particle mobility, and combinations thereof.

The computing system 118 may also include communications electronics 124, which may be used to send or receive information from outside of the device 100. For example, the communications electronics 124 may include one or more of an electronic display, a printer, indicator lights, data storage components (e.g., hard disk, flash drive, etc.), a wired or wireless communications module, and/or software to assist in data presentation, analysis, comparison, interpretation, etc.

The device 100 may include an enclosure 126, which may contain and/or enclose one or more of the other components. The enclosure 126 may protect the device 100 from one or more environmental hazards. For example, the enclosure 126 may provide protection against thermal shock, protection against mechanical shocks, vibration resistance, protection from hazardous environmental conditions, prevention of dust contamination, prevention of electrical shorting. The enclosure 126 may also make the system easier to handle. In some embodiments, the enclosure 126 may surround the other components of the device 100. In some embodiments the enclosure 126 may be at least partially open to allow access to one or more components of the device 100.

In some embodiments, one or more components of the device 100 may be packaged together. For example, the well 102, mass 112, sensor 108, sensing element 110, and actuators 115, 116 may be fabricated on (and/or attached to) a single chip. The chip may have connectors for coupling to the computing system 118. In other embodiments, all of the components shown in FIG. 1 may be packaged together. In some embodiments, one or more of the components (e.g., the sensor 108, sensing element 110, and/or actuators 115, 116) may be micro-fabricated. In some embodiments one or more of the components of the device 100 may be micro-electromechanical system (MEMS) devices. The micro-fabricating may include methods such as surface micromachining on wavers (which may include MEMS processes such as SUMMIT, SUMMIT V, MUMPS, etc.), bulk micromachining of wafers, soft lithography (e.g., nanoimprint lithography), additive microfabrication (e.g., inkjet, 3D printing), top-down nanofabrication methods such as ebeam lithography, focused ion beam, etc., bottom-up nanofabrication methods such as self-assembly, and combinations thereof.

In some embodiments the device 100 may be designed for a set number of uses before disposal. For example, the device 100 may be disposable after a single use. In some embodiments, one or more components of the device may be modular. For example, different sensing elements may be used for different types of fluids. The different sensing elements may have different geometries and/or coatings to accommodate different types of fluids.

Figure 2:
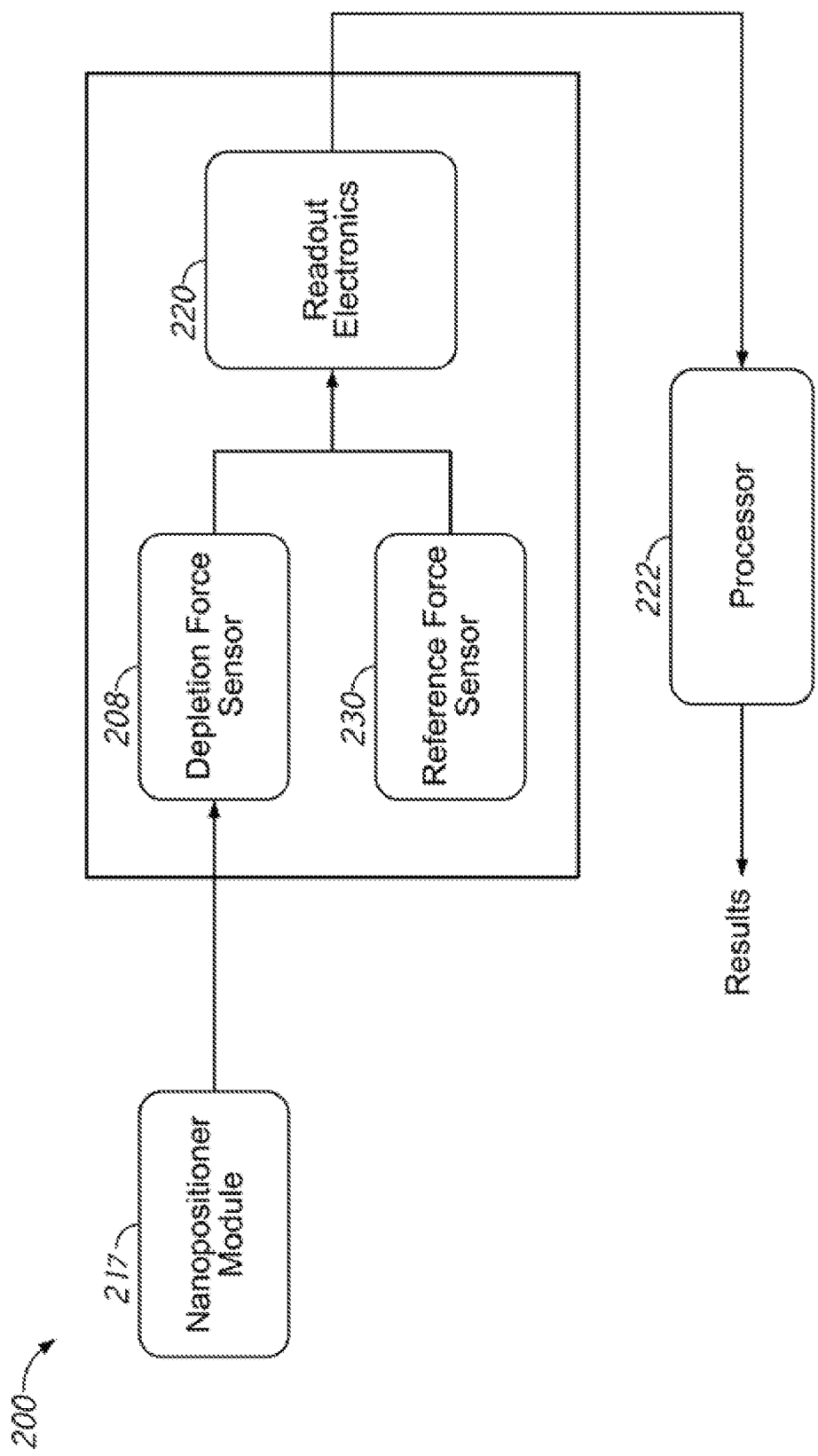
FIG. 2 is a schematic diagram depicting a sensor signal path arranged in accordance with at least some embodiments described herein.

FIG. 2 is a schematic diagram depicting a sensor signal path arranged in accordance with at least some embodiments described herein. The signal path 200 shows the coupling of different components that may be used in the operation of the device 100 of FIG. 1. The signal path 200 includes a nanopositioner module 217, a sensor 208, a reference sensor 230, readout electronics 220, and a processor 222. The various components described in FIG. 2 are merely examples, and other variations, including eliminating components, combining components, and substituting components are all contemplated.

The nanopositioner module 217 may control and/or measure the position of the components of the system in order to determine the size of the gap between the sensing element and the mass (e.g., the gap 114 of FIG. 1). The nanopositioner module 217 is coupled to the sensor 208. The sensor 208 and the reference sensor 230 each provide signals to the readout electronics 220. The readout electronics in turn are communicatively coupled to the processor 222, which provides one or more results, such as properties of the test fluid (e.g., particle size).

The nanopositioner module 217 may be a component of a computing system (e.g., computing system 118 of FIG. 1), or may be a separate component of a device. The nanopositioner module 217 may include one or more analog and/or digital circuits. The nanopositioner may be coupled to processor (e.g., processor 122 of FIG. 1) and may receive one or more signals which may indicate a desired size of the gap. The nanopositioner may operate one or more actuators (e.g., actuators 115, 116 of FIG. 1) to change the size of the gap. In some embodiments, the nanopositioner module 217 may provide a signal which indicates that the actuator(s) have achieved a desired position. In some embodiments the nanopositioner module 217 may include sensors coupled to the actuators, and may provide a measurement of the position of the actuators.

The sensor 208 and reference sensor 230 may be physically identical components in some examples. The sensor 208 may be positioned such that it experiences a depletion force. The reference sensor 230 may experience other forces acting on the sensor 208 except for the depletion force. Each of the sensor 208 and the reference sensor 230 may provide a signal proportional to a force acting on a respective sensing element of the sensor 208 and reference sensor 230. In some embodiments the sensor 208 and reference sensor 230 may be analog electrical components which provide a voltage and/or current which is related to the force on the sensor.

The readout electronics 220 may receive the signals from the two sensors 208 and 230 and condition and/or process the raw signals received. For example the readout electronics 220 may filter the signals to remove noise and/or amplify the signals to make them more easily readable by other components. The readout electronics 220 may provide the signals to the processor 222. In some embodiments, the readout electronics 220 may provide the signals to one or more types of storage media, and the processor 222 may retrieve the signals from the storage media. In some embodiments, the readout electronics 220 may electronically condition the signal from the sensor 208 based on the signal from the reference sensor 230 (e.g., by subtracting the signal from the reference sensor 230 from the signal from the sensor 208).

The processor 222 may use the information from the sensors (as provided by the readout electronics 220) to characterize the test fluid. The processor 222 may combine the information from the sensors 208 and 230 with other information in order to characterize the test fluid. For example, the processor 222 may be coupled to additional sensors, such as temperature sensors which indicate a current temperature of the test fluid. The processor may also receive information from the nanopositioner module 217, which may indicate the size of the gap. The processor 222 may also access one or more pieces of information which may be stored on readable medium such as physical constants and/or known properties of the system (e.g., the gap size in embodiments where the gap is fixed).

The processor 222 may perform one or more operations to characterize properties of the fluid. For example, the processor 222 may associate one or more of the sensor signals (e.g., force-displacement curves, etc.) with a quantitative value of a fluid property (e.g., concentration and/or density of particles) using a look-up table or other mathematical relationship. In some embodiments, the processor may use one or more mathematical models to determine properties of the fluid and/or particles. In some embodiments, the processor 222 may use machine learning to determine fluid properties based on sensor signals. Generally, machine learning may include using a model to classify the incoming sensor signals to one or more fluid properties. The model may be developed, for example, using training (e.g., supervised and/or unsupervised learning may be used). In some examples, the model may be trained on data obtained from known fluids and/or fluid properties. For example, the processor may be provided a training set which includes a variety of force vs. gap size curves, each of which may have been generated with a variety of different particle sizes, concentrations, size distributions, scan rates (rates at which the gap size is changed), etc. The processor 222 may then generate one or more models (e.g., empirical relationships, weights for a neural network) based on the training data, and may use these models to classify the information received from the sensor 208 (and/or other sources) into characteristics of the particles.

In some embodiments, the processor 222 may direct a measurement procedure. For example the processor 222 may operate a series of instructions, which may be stored on a non-transitory computer readable medium. In an example operation, the processor 222 may direct the nanopositioner module 217 to establish a particular size of gap, and then store information recorded by the sensors 208 and 230. The processor 222 may then instruct the nanopositioner module 217 to establish a second size of gap and again store information recorded by the sensors 208 and 230. Once measurements have been collected from a number of a different gap sizes, the processor 222 may then characterize the test fluid based on a relationship between the different gap sizes and the measurements.

The processor 222 may be configured to issue instructions for one or more actions based on the characterized test fluid. As an example, the processor 222 may provide results to communications electronics (e.g., communications electronics 124 of FIG. 1) such that the results may be displayed. In another example, if the determined properties are outside of a given range (e.g., if the concentration of particles is below a threshold) the processor may issue instructions to production equipment to increase the amount of particles added to the test fluid. In addition (or alternatively) the processor may activate an alarm in order to allow for further investigation and/or manual adjustment of the test fluid.

Figure 3:
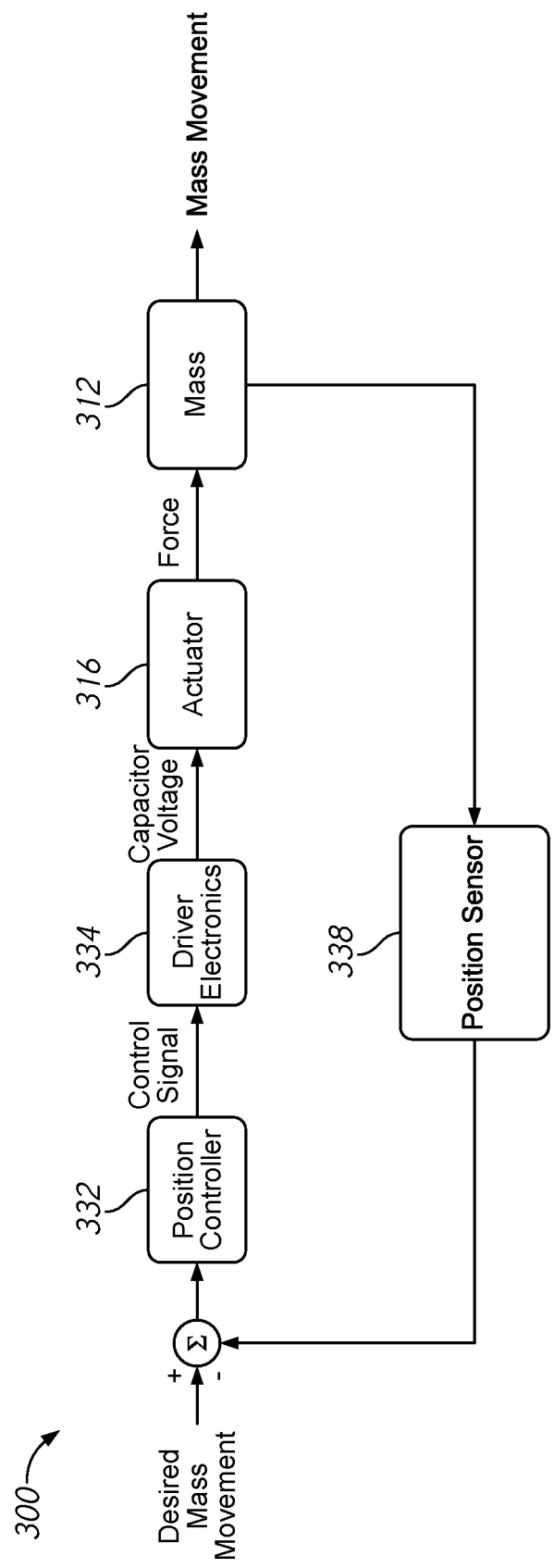
FIG. 3 is a schematic diagram depicting a position control path arranged in accordance with at least some embodiments described herein.

FIG. 3 is a schematic diagram depicting a position control path arranged in accordance with at least some embodiments described herein. The control path 300 includes a position controller 332, driver electronics 334, actuator 316, mass 312, and position sensor 338. The control path 300 may be used as an implementation of the nanopositioner module 217 of FIG. 2 in some embodiments. The various components described in FIG. 3 are merely examples, and other variations, including eliminating components, combining components, and substituting components are all contemplated.

The control path 300 may receive a desired movement (e.g., from a processor). The desired movement may act as positive feedback on the position controller 332. The position controller 332 may also receive a signal from a position sensor 338, which may act as negative feedback. Responsive to the desired position and the signal from the position sensor 338, the position controller 332 may provide a control signal to the driver electronics 334. The driver electronics may translate the control signal into an electrical signal (e.g., a capacitor voltage) and provide it to the actuator 316. In response to the electrical signal, the actuator 316 may move. The movement of the actuator 316 may move the mass 312, which may change the signal provided by the position sensor 338. The components of the control path 300 may be positioned on the same chip as the rest of the device (e.g., device 100 of FIG. 1) or may be a separate component (e.g., in the computing system 118 of FIG. 1) that the device couples to.

Figure 4:
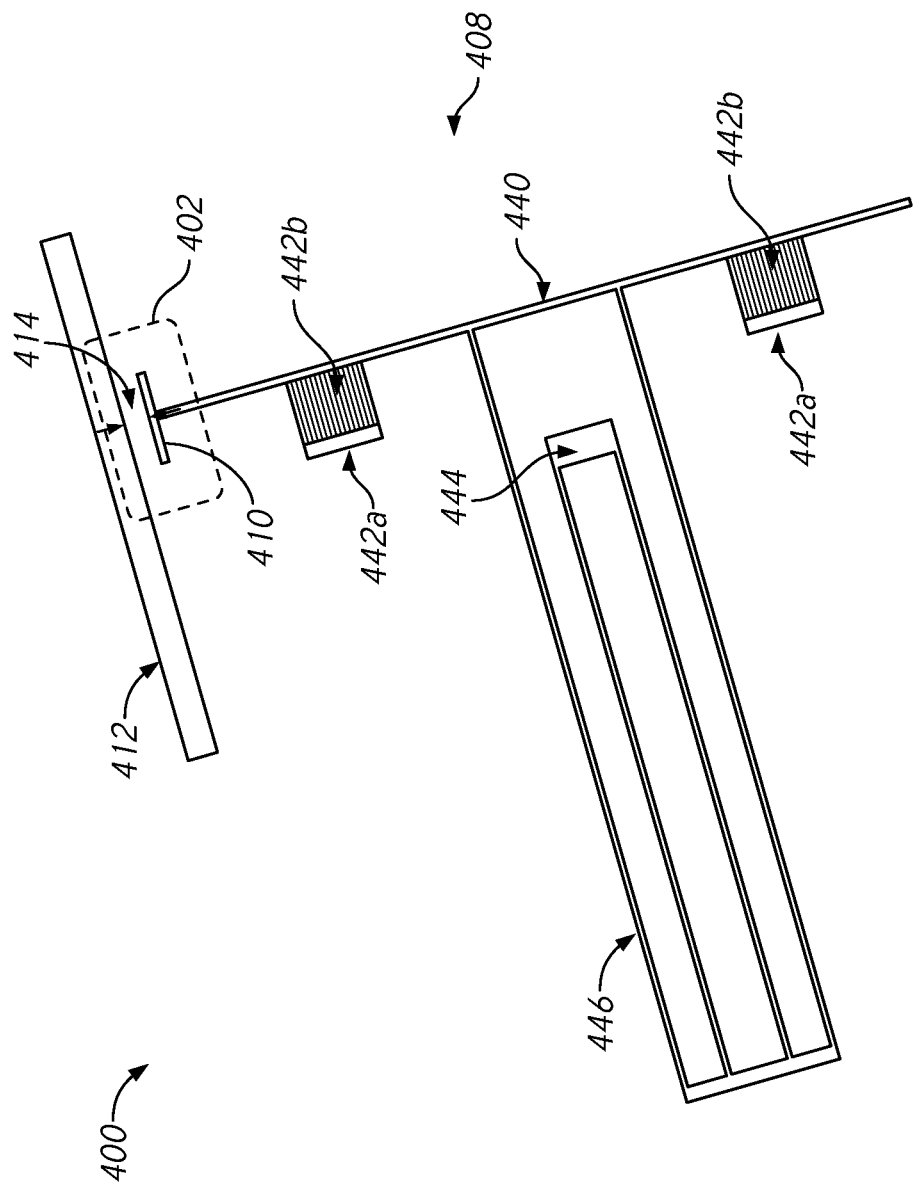
FIG. 4 is a schematic diagram depicting a micro-fabricated depletion force sensor arranged in accordance with at least some embodiments described herein.

FIG. 4 is a schematic diagram depicting a micro-fabricated depletion force sensor arranged in accordance with at least some embodiments described herein. The sensor 408 is shown a region 400, which includes other components useful for describing the operation of the sensor 408. The sensor 408 includes a sensing element 410, a sensor arm 440, an anchor support 444, a flexible beam 446, and comb electrodes which include floating combs 442b and fixed combs 442a. Also shown in FIG. 4 are a well 402, mass 412, and gap 414. In some embodiments, the sensor 408 may implement the sensor 108 of FIG. 1. The various components described in FIG. 4 are merely examples, and other variations, including eliminating components, combining components, and substituting components are all contemplated.

The anchor support 444 may attach the flexible beam 446 to a surface of the device. The sensor arm 440 may be coupled to the flexible beam 446 such that the sensor arm 440 is able to move along at least one axis as the flexible beam 446 flexes about the anchor support 444. The sensor arm is coupled along its length to a pair of comb electrodes, each of which includes a fixed comb 442a coupled to a stationary component of the sensor and a floating comb 442b coupled to the sensor arm 440. The sensor arm 440 extends into the well 402, and is coupled to the sensing element 410. The sensing element 410 is positioned across a gap 414 from a mass 412, which is positioned along an edge of the well 402.

The flexible beam 446 may act as a spring coupled between the anchor support 444 and the sensor arm 440. The sensor arm 440 may be a 'floating' component, such that it is free to move except as constrained by the flexible beam 446. The anchor 444 may couple the flexible beam 446 to a fixed point, such as a surface of the device. The flexible beam 446 may bias the sensor arm 440 to a position such that there is a known nominal size of the gap 414 between the sensing element 410 and the mass 412. Depletion forces acting on the sensing element 410 may displace the sensing arm 440 towards the mass 412.

The fixed combs 442a may each be coupled to a fixed point (e.g., the same surface that the anchor 444 is coupled to). The floating combs 442b may be coupled to the sensor arm 440, and may move relative to the fixed combs 442a as the sensor arm 440 is displaced. Each of the floating combs 442b and fixed combs 442a may be coupled to electrodes. The electrodes may measure a change in the electrostatic properties of the interaction between the floating comb 442b and the fixed comb 442a, as the 'teeth' of the combs move past each other. The electrodes may provide a signal as the sensor arm 440 is deflected along an axis towards the mass 412 by a depletion force acting on the sensing element 410. In this manner, the electrodes coupled to the combs may provide a signal which is proportional to the force acting on the sensing element 410. Although only two pairs of fixed and floating combs 442a, 442b are shown in the example region 400 of FIG. 4, it is to be understood that more or fewer pairs of combs may be used in other sensor embodiments.

Figure 5:
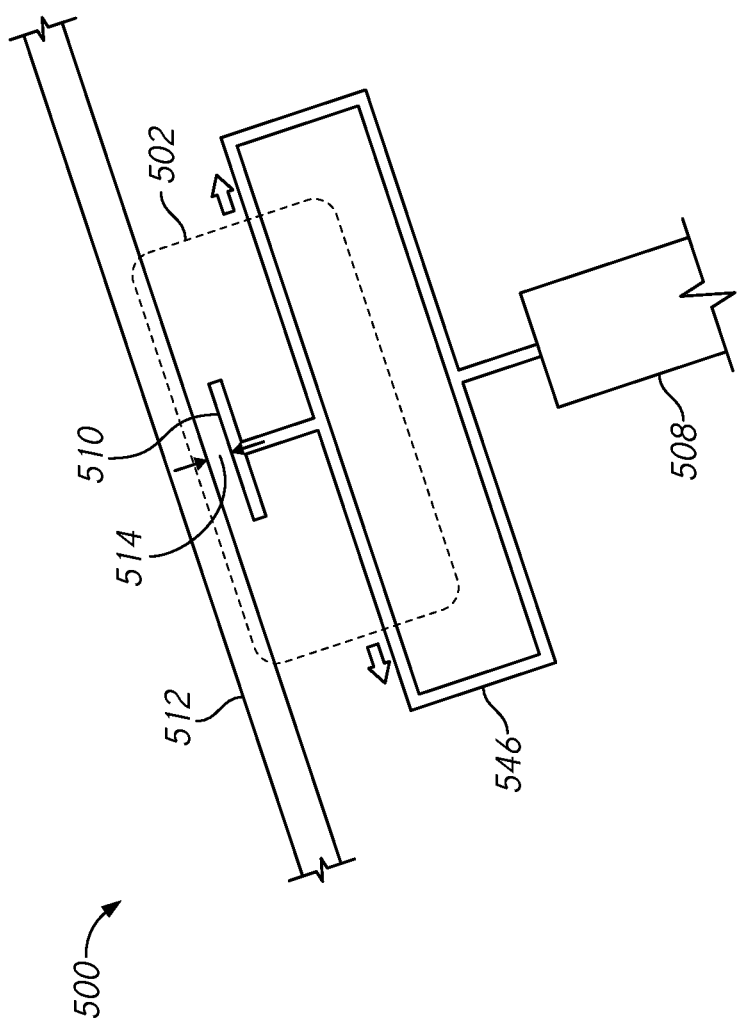
FIG. 5 is a schematic diagram depicting a depletion force sensing region arranged in accordance with at least some embodiments described herein.

FIG. 5 is a schematic diagram depicting a depletion force sensing region arranged in accordance with at least some embodiments described herein. The region 500 may be an implementation of part of the sensor 408 of FIG. 4 in some embodiments. The region 500 includes a sensor arm 540, a sensing element 510, a gap 514, a mass 512, and a well 502. The various components described in FIG. 5 are merely examples, and other variations, including eliminating components, combining components, and substituting components are all contemplated.

The region 500 of FIG. 5 shows an alternative sensor arm 500 which may be used in some embodiments. The sensor arm 500 is coupled between the rest of a sensor (not shown) which is positioned outside of the well 502 and the sensing element 510 which is positioned in the well 502. The sensing element 510 is positioned across a gap 514 from a mass 512, which has at least one surface which may be in contact with a test fluid in the well 502.

Capillary forces may act on the portion of the sensor arm 540 which extends into the well 502. The sensor arm 540 may be shaped to reduce the effect of the capillary forces on the measurement. The sensor arm 540 may include one or more beams which experience capillary forces which are not along (e.g., orthogonal to) the measurement axis. The sensor arm 540 may include multiple beams which experience opposing capillary forces in order to cancel out the capillary forces.

As shown in FIG. 5, the sensor arm 540 includes four beams arranged in a rectangle. Three of the beams are positioned outside the well 502, while the fourth beam extends through the well 502. The beam which extends through the well 502 may generally be parallel to the mass 512, and thus may be generally orthogonal to the axis along which the depletion force acts. As shown by the arrows, since the fourth beam extends across the width the well 502, capillary forces may act on either side of the beam where the beam crosses a surface of the well 502. Since these two forces are acting in opposite directions along the fourth beam, and since the beam may generally be symmetric, the capillary forces may generally cancel each other out.

Figure 6:
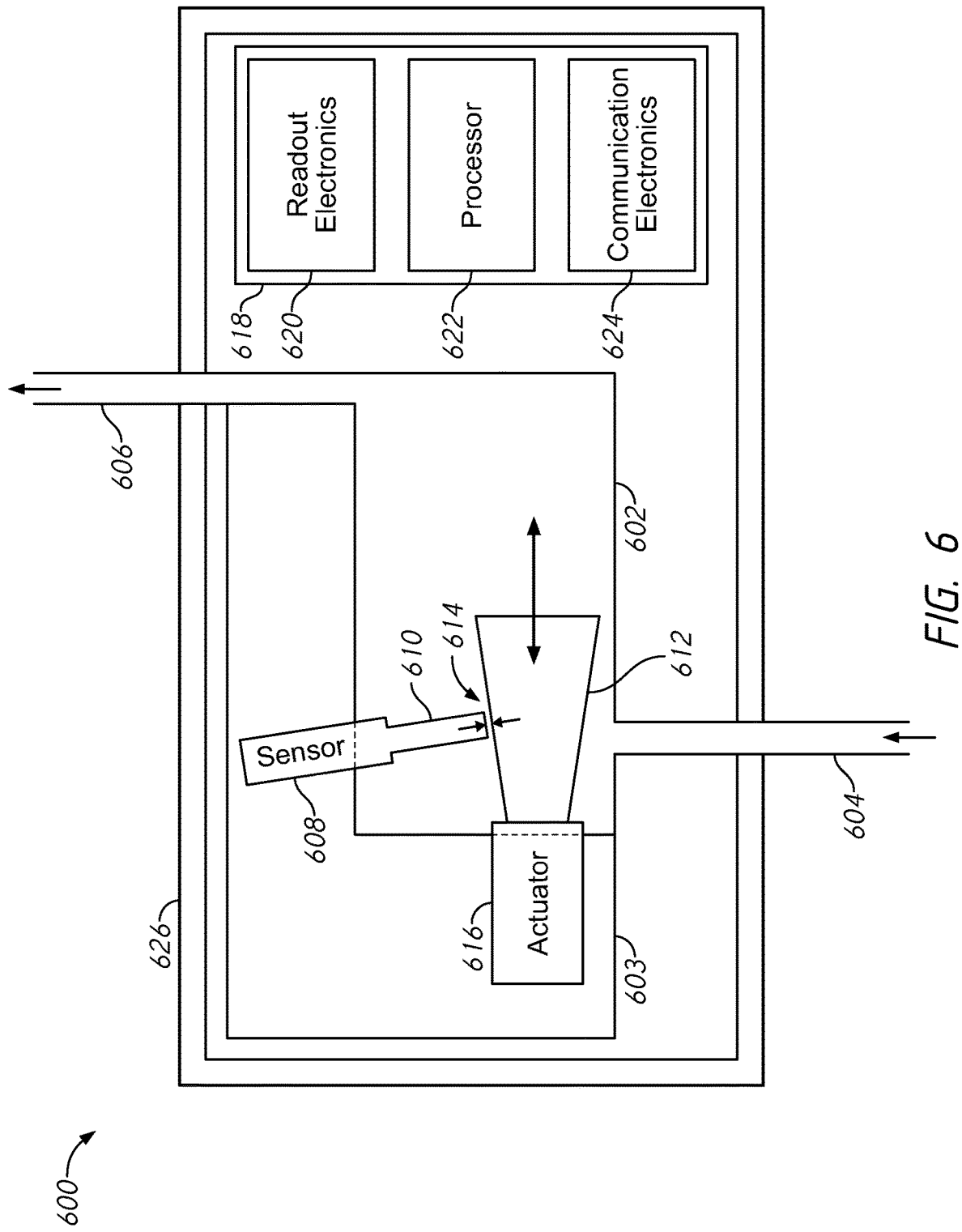
FIG. 6 is a schematic diagram depicting a depletion force measurement device with a wedge shaped mass in accordance with at least some embodiments described herein.

FIG. 6 is a schematic diagram depicting a depletion force measurement device with a wedge shaped mass in accordance with at least some embodiments described herein. In some embodiments, the device 600 may be an implementation of the device 100 of FIG. 1 with a selectively variable defined gap. The device 600 includes a well 602, a fluid 603, an inlet 604, an outlet 606, a sensor 608, a sensing element 610, a mass 612, an actuator 616, a computing system 618, readout electronics 620, a processor 622, communications electronics 624, and an enclosure 626. The various components described in FIG. 6 are merely examples, and other variations, including eliminating components, combining components, and substituting components are all contemplated.

The device 600 may include many components which are generally similar to corresponding components of the device 100 of FIG. 1. For the sake of brevity, components which have been previously described will not be described again with respect to FIG. 6. The device 600 has a wedge-shaped mass 612 which is coupled to an actuator 616. The actuator 616 displaces the mass 612 along an axis (represented by a double headed arrow) to change a size of the gap 614 between the sensing element 610 and a surface of the mass 612. The actuator 616 and the sensor 608 may be positioned outside of the well 602 in a fluid 603, which may be immiscible with a test fluid.

The mass 612 may have a wedge shape. The mass 612 may generally be triangular or trapezoidal. The surface of the mass 612 which faces the gap 614, may generally be at an angle (e.g., not parallel to) to the axis that the mass 612 is displaced along. The sensing element 610 has a face on the other side of the gap 614 which may generally be parallel to the surface of the mass 612. Accordingly, as the mass 612 is displaced along the axis, the size of the gap 614 may change. Since the surface of the mass 612 facing the gap 614 is angled relative to the axis of displacement, a relatively large displacement along the axis may yield a relatively small change in the size of the gap 614. In this manner, an actuator 616 which is relatively imprecise (e.g., cannot accurately produce very small changes in displacement) may still produce precise changes to the size of the gap 614.

The angle between the surface of the mass 612 and the displacement axis may determine the magnitude of change in the size of the gap 614 per unit displacement. Masses with different angles may be used in different applications. In some embodiments, the device 600 may include multiple actuators 616, sensors 608, and masses 612, wherein each of the masses has a different angle between the surface and the displacement axis. This may allow for a wide range of gap sizes to be produced, which may allow for a broad range of particles in the test fluid to be characterized.

In some embodiments, the actuator 616 and/or sensor 608 may be sensitive to one or more environmental conditions. For example, if the actuator 616 and sensor 608 are electrostatic in nature, then the dielectric constant of the fluid they are immersed in may determine their operation. The well 602 may be (partially or totally) surrounded by a fluid 603 which is immiscible with a one or more envisioned test fluids that may be contained in the well 602. Portions (or all of) the sensor 608 and the actuator 612 may be positioned outside of the well 602 and in the fluid 603. In some embodiments, the fluid 603 may have known properties (e.g., a known dielectric constant). The fluid 603 may be chosen based on expected properties of the test fluid. For example, if the test fluid is expected to be aqueous, the fluid 603 may be air, inert gases, organic, solvents, silicone oils, paraffins, engineered fluids, perfluorinated fluids, or combinations thereof. If the test fluid is expected to be non-polar, the fluid 603 may be polar fluids, gases, or combinations thereof. In some embodiments, the fluid 603 may be a gel.

Figure 7:
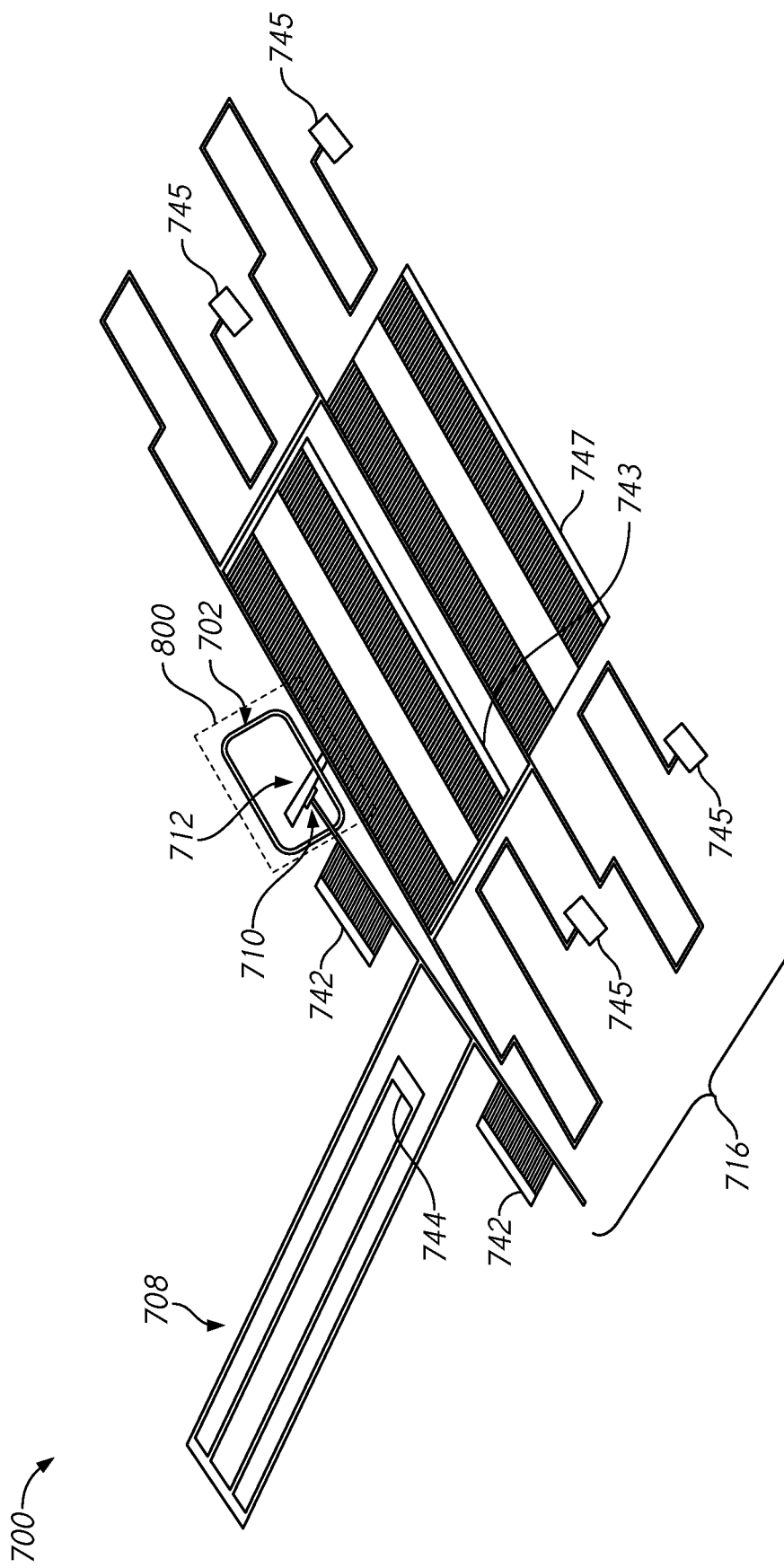
FIG. 7 is a schematic diagram depicting a micro-fabricated depletion force measurement device with a wedge shaped mass in accordance with at least some embodiments described herein.

FIG. 7 is a schematic diagram depicting a MEMS depletion force measurement device with a wedge shaped mass in accordance with at least some embodiments described herein. The device 700 may be an implementation of the device 600 of FIG. 6 in some examples. The device 700 includes a well 702, a sensor 708, a sensor anchor 744, comb electrodes 742, a sensing element 710, a mass 712, an actuator 716, actuator anchors 745, comb actuator 743, comb sensor 747, and a region 800. The various components described in FIG. 7 are merely examples, and other variations, including eliminating components, combining components, and substituting components are all contemplated.

For the sake of brevity, components similar to those previously described will not be described again in relation to FIG. 7. In particular, the sensor 708 may be generally similar to the sensor 400 of FIG. 4.

The mass 712 may be coupled to an actuator 716 which is an electrostatic actuator. The actuator 716 may include a comb actuator 743 which displaces the mass 712 along an axis, and a comb sensor 747 which measures the displacement of the mass 712. The comb actuator 743 and comb sensor 747 may both be coupled to a system (e.g., computing system 118 of FIG. 1) which may be used to determine accurate positioning of the mass 712. The comb actuator 743 and comb sensor 747 may be operated with a feedback loop similar to the one depicted in FIG. 3.

The actuator 716 may include actuator anchors 745, which may couple a portion of the actuator 716 to a fixed point. In some embodiments, the actuator anchors 745 and the sensor anchor 744 may both be attached to the same surface. The comb actuator 743 and comb sensor 747 may each be coupled to two actuator anchors 745.

Each of the comb actuator 743 and the comb sensor 747 may include a fixed comb and a floating comb. The fixed combs may be coupled to the anchors 745 along flexible arms. The comb sensor 747 may operate in a similar manner to the comb electrodes 742 of the sensor 708 or the combs 442a, b described in FIG. 4. A charge may be applied to the comb actuator 743 to move the floating comb relative to the fixed comb. The mass 712 may be coupled to the floating comb. The floating comb of the comb actuator 743 may be coupled to the floating comb of the comb sensor 747, such that displacement of the comb actuator 743 also causes a displacement of the comb sensor 737.

Figure 8:
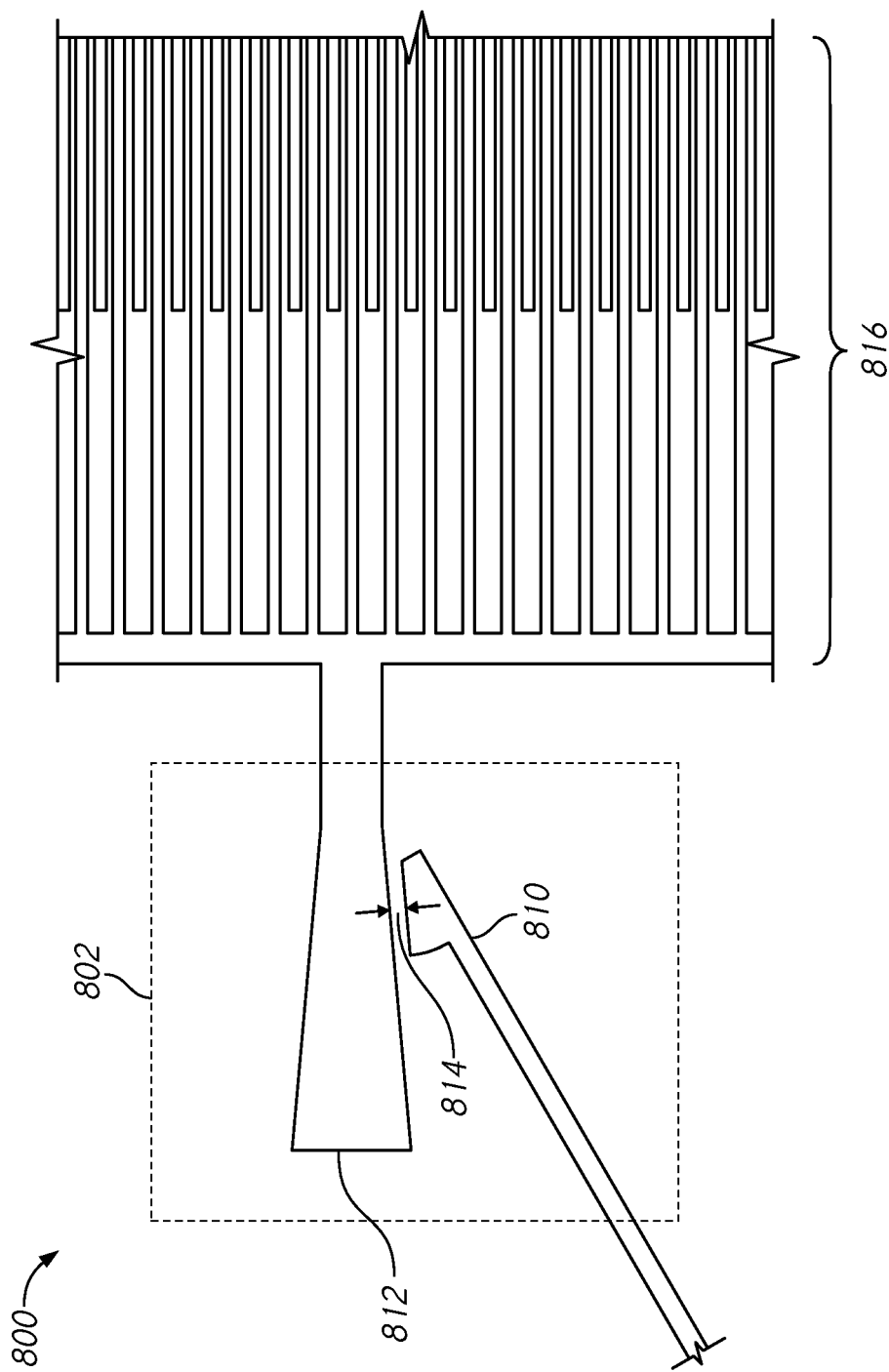
FIG. 8 is a schematic diagram depicting a region 800 of the micro-fabricated depletion force measurement device with a wedge shaped mass of FIG. 7 in accordance with at least some embodiments described herein.

FIG. 8 is a schematic diagram depicting a region 800 of the MEMS depletion force measurement device with a wedge shaped mass of FIG. 7 in accordance with at least some embodiments described herein. The region 800 shows the well 702, sensing element 710, gap 714, mass 712, and a portion of the actuator 716 in more detail. The various components described in FIG. 8 are merely examples, and other variations, including eliminating components, combining components, and substituting components are all contemplated.

The sensing element 710 may be positioned at the end of an arm which couples the sensing element 710 to a sensor (not shown in FIG. 8). The sensing element 710 may be immersed in the well 702, and may be a wedge shaped or triangular member positioned at the end of the arm. The sensing element 710 has a face adjacent the gap 714 which is generally parallel to a surface of the mass 712.

The mass 712 is coupled by an arm to a floating comb of the actuator 716 (specifically to a floating comb of the comb actuator 743). The mass 712 and the arm it's attached to may consist of more material than the sensing element 710 and its respective arm. This may mean that the mass 712 undergoes relatively little deflection from the depletion force.

Figure 9:
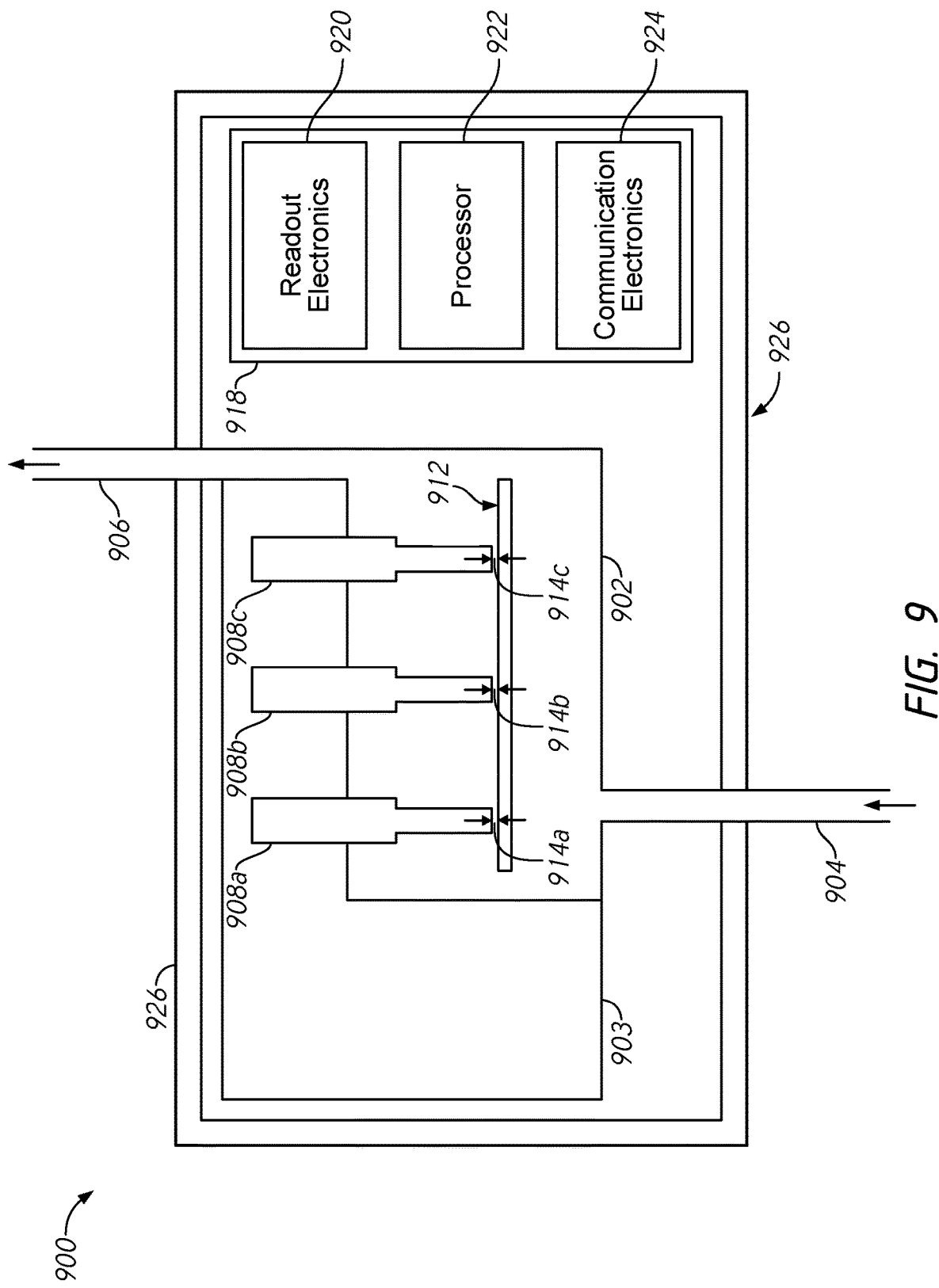
FIG. 9 is a schematic diagram depicting a depletion force measurement device with multiple sensors in accordance with at least some embodiments described herein.

FIG. 9 is a schematic diagram depicting a depletion force measurement device with multiple sensors in accordance with at least some embodiments described herein. The device 900 includes a well 902, a fluid 903, an inlet 904, an outlet 906, a plurality of sensors 908a-c, corresponding sensing elements 910a-c, mass 912, gaps 914a-c, computing system 918, readout electronics 920, processor 922, communication electronics 924, and enclosure 926. The various components described in FIG. 9 are merely examples, and other variations, including eliminating components, combining components, and substituting components are all contemplated.

The device 900 may be an implementation of the device 100 of FIG. 1 in some embodiments. The device 900 includes multiple sensors 908a-c, each of which has a corresponding sensing element 910a-c which is a different distance of gap 914a-c from the mass 912. Many of the components of the device 900 may generally be similar to the corresponding components of the device 100 of FIG. 1. For the sake of brevity, these components will not be described again.

In the device 900, the mass 912 and the sensors 908a-c may be fixed relative to each other. The mass 912 may be a wall which is affixed to a surface of the device 900. Each sensing element 910a-c is at a fixed nominal distance away from the mass 912. Since the depletion force may depend on the size of the gap 914a-c compared to size of the particles in the test fluid, each of the sensing elements 910a-c may experience a different amount of depletion force from particles of different size ranges. The processor 922 may determine the size of particles in the test fluid and/or the distribution of the particles by comparing the forces acting on the different sensors 908a-c.

Figure 10:
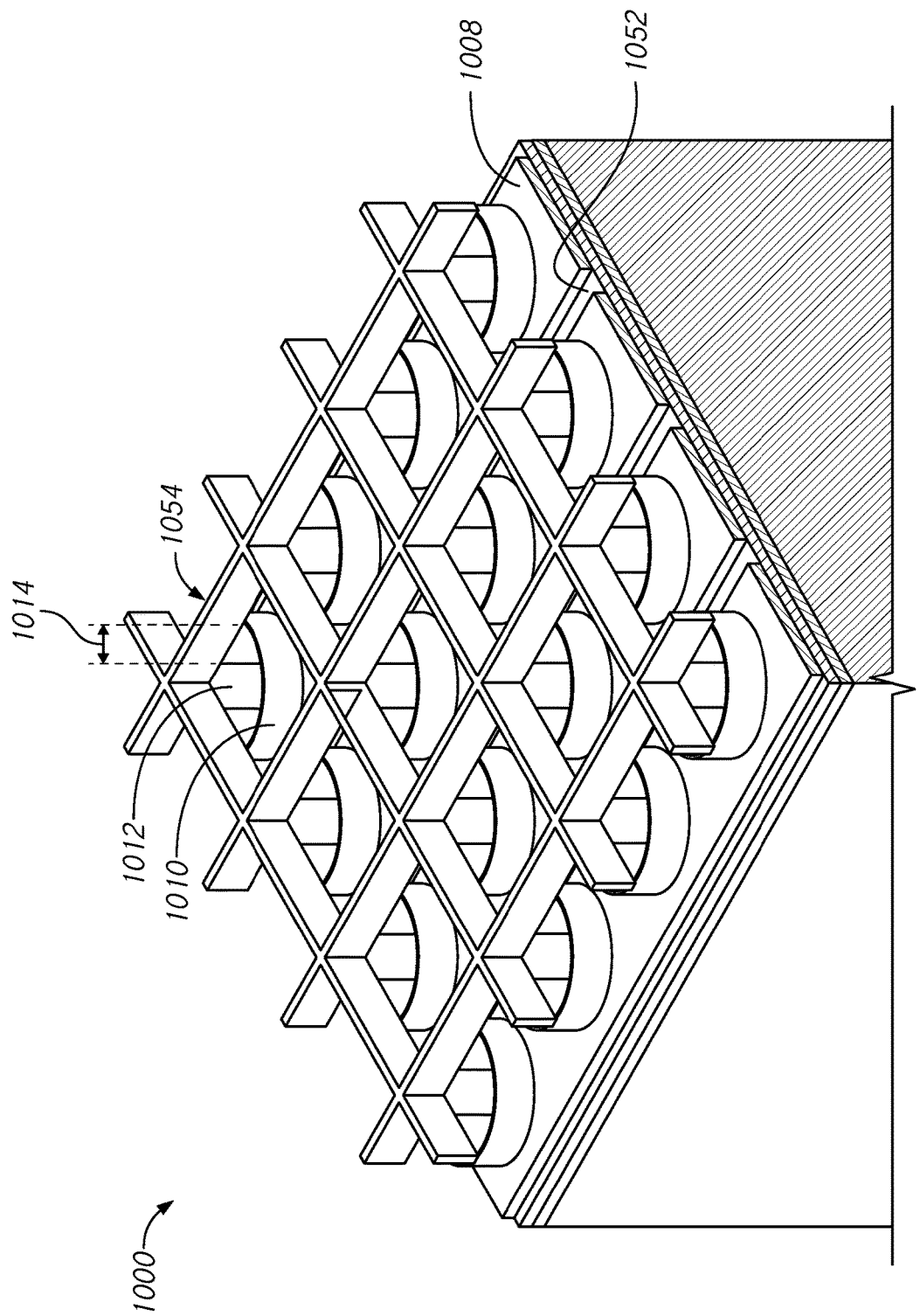
FIG. 10 is a schematic diagram depicting a fluctuating gap depletion force measurement device in accordance with at least some embodiments described herein.

FIG. 10 is a schematic diagram depicting a fluctuating gap depletion force measurement device in accordance with at least some embodiments described herein. The device 1000 includes stationary masses 1012, fluctuating elements 1010, gap 1014, sensing electrodes 1008, insulation 1052, and cover 1054. The various components described in FIG. 10 are merely examples, and other variations, including eliminating components, combining components, and substituting components are all contemplated.

In some embodiments, the device 1000 may be an implementation of the device 100 of FIG. 1. For the sake of clarity, FIG. 10 only shows features directly related to the stationary mass(es) 1012 and fluctuating element(s) 1010. However, it is to be understood that the device 1000 may include other features of the device 100 of FIG. 1 not shown in FIG. 10. For example, the device 1000 may include an enclosure, inlet, outlet, well, computing unit, and/or other features/components analogous to those discussed in regards to the device 100 of FIG. 1. The device 1000 is an embodiment with an array of sensors masses, each of which has a fluctuating gap. Although an array of the sensors and masses is shown in the example embodiment of FIG. 10, it is to be understood that the fluctuating gap mass and sensor of FIG. 10 could also be utilized with only a single mass and sensor.

In the device 1000, fluctuating elements 1010 are each positioned about a respective stationary mass 1012. The fluctuating elements 1010 are each free to move along at least one axis such that the size of a gap 1014 between the fluctuating element 1010 and its respective mass 1012 can vary. Each stationary mass 1012 is coupled to a sensing electrode 1008. The sensing electrodes 1008 are each separated from neighboring of the sensing electrodes 1008 by insulation 1052, which may take the form of an insulating gap between the sensing electrodes 1008. A cover 1054 is positioned across the array of fluctuating elements 1010 and masses 1012 in order to at least partially constrain the motion of each of the fluctuating elements 1010 relative to the mass 1012.

The device 1000 uses a specific geometry in which the stationary mass 1012 is a post, while the fluctuating element 1010 is a hoop. In other embodiments other geometries of the fluctuating element 1010 and/or mass 1012 may be used to achieve a fluctuating gap. For example, in one embodiment, the fluctuating element may be a cube, while the mass 1012 may be a cage which constrains the motion of the cube. In another embodiment, the fluctuating element may be a log, while the mass may be a channel that the log can move along. Other geometries are possible in other examples.

The fluctuating element 1010 may be in the shape of a hoop. The hoop may be generally circular with an open center. The stationary mass 1012 may take the form of a post, which may be a cylinder with a radius smaller than a radius of the open center of the fluctuating element 1010. The fluctuating element 1010 may be positioned such that the stationary mass 1012 is positioned such that it passes through the open center of the fluctuating element 1010. The fluctuating element 1010 may thus travel to a variety of positions about the stationary mass 1012, up until limited by contact between the inner wall of the fluctuating element 1010 and the outer surface of the stationary mass 1012. The fluctuating elements 1010 may be constrained in one or more axes by the geometry of the device. For example, the cover 1054 and the sensing electrode 1008 may limit travel of the fluctuating element 1010 along an axis up and down the post of the stationary mass 1012. This may simplify geometry and/or prevent the fluctuating element 1010 from separating from its respective stationary mass 1012. Additional constraints to the motion of the fluctuating element 1010 may also be introduced. For example, in the embodiment of device 1000 where there are an array of fluctuating elements 1010, a group of the fluctuating elements 1010 may be coupled together. For example, each line (e.g., row or column) of the fluctuating elements 1010 may be coupled together.

The gap 1014 may be the distance between the outer wall of the mass 1012 and an inner wall of the fluctuating element 1010. The gap 1014 may be used as an indicator of the position of the fluctuating element 1010 about the stationary mass 1012. Because the fluctuating element 1010 is free to move about the stationary mass 1012, the position of the fluctuating element 1010 about the mass 1012, and thus the size of the gap 1014, will fluctuate over time. The fluctuating element 1010 and the stationary mass 1012 may both be in contact with (e.g., immersed in) the test fluid. In some embodiments, the fluctuating element 1010 may be allowed to move randomly. In some embodiments the fluctuating element 1010 may move responsive to a current in the test fluid. In some embodiments, a current may deliberately be induced in the test fluid (e.g., with a pump), such as to induce an oscillating flow across the fluctuating element 1010 and stationary mass 1012. In some embodiments other forces may be used to influence the fluctuating elements, such as external vibration, acoustic excitation, etc.

As the fluctuating element 1010 moves about the stationary mass 1012, it may experience a depletion force. In particular, as the size of the gap 1014 changes, particles may be excluded from the gap 1014 while still having an effect on an outer surface of the fluctuating element 1010. This may bias the fluctuating element 1010 to positions where the size of the gap 1014 provides the depletion force. In other words, as the fluctuating element 1010 travels about the mass 1012, positions where the gap 1014 is small enough may be 'sticky' and the fluctuating element 1010 may spend more time in these positions.

The position of the fluctuating element 1010 relative to the mass 1012 may be measured over time, and one or more properties of the test fluid determined based on displacement of the fluctuating element 1010 over time. In particular, the amount of time spent at any given position (e.g., the eccentricity of the fluctuating elements 1010 center relative to the mass 1012) may be used as an indicator of the depletion forces acting on the fluctuating element 1010. In the example embodiment of the device 1000, capacitive sensing is used to determine the position of the fluctuating element 1010. The fluctuating element 1010 and the mass 1012 may both be made of a conductive material. The sensing electrode 1008 may be a conductive material which is coupled to the mass 1012. The sensing electrode 1008 may be electrically separated from adjacent sensing electrodes by insulator 1052. The cover 1054 may be an insulating material (e.g., nitride). As the fluctuating element 1010 moves about the mass 1012, it may change a capacitance between the sensing electrode 1008 and adjacent sensing electrodes 1008 (which may reflect the change in capacitance between adjacent of the masses 1012). Other measurement modalities, such as optical sensing or magnetic sensing, may be used in other embodiments.

Figure 11:
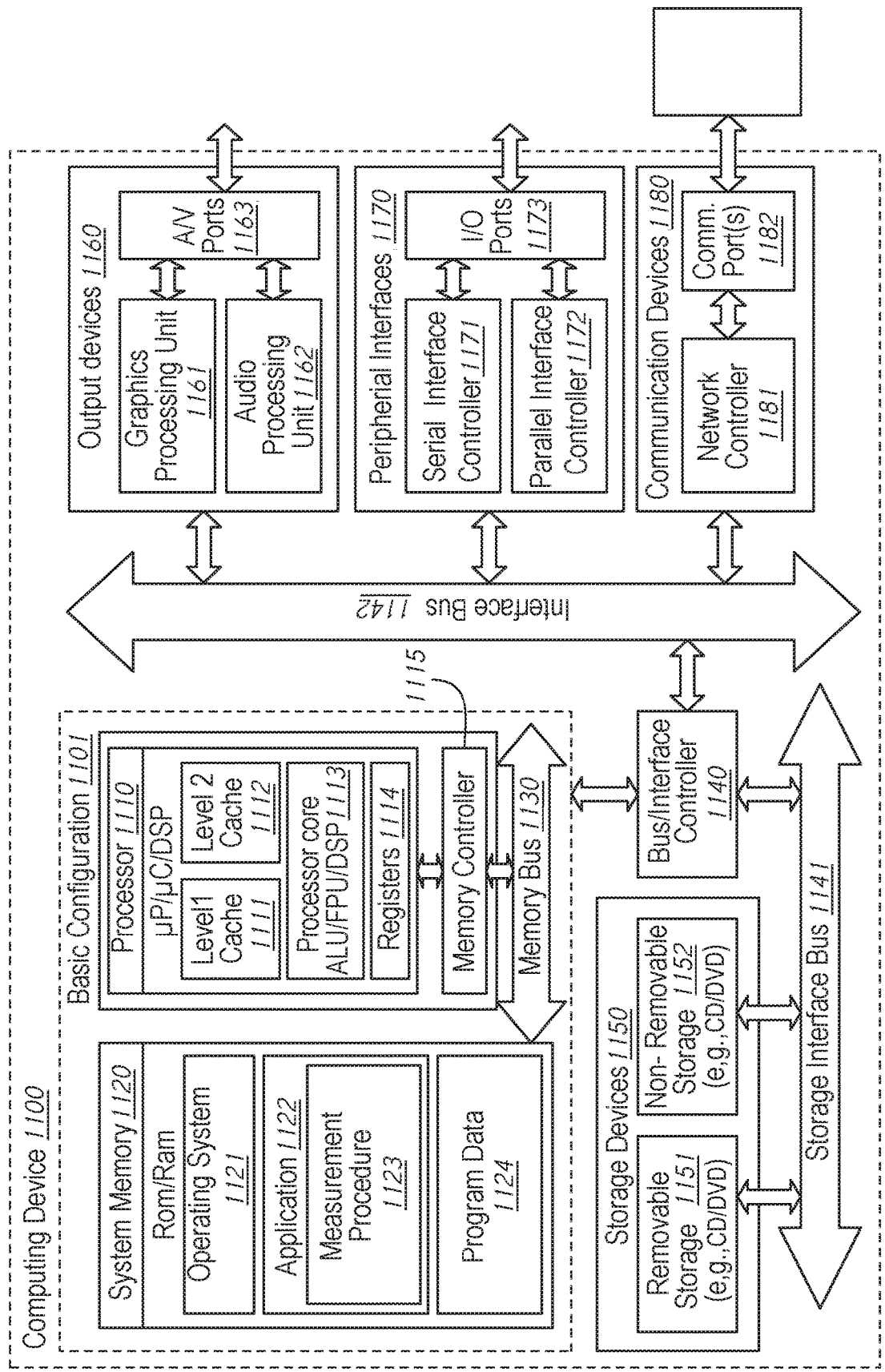
FIG. 11 is a block diagram illustrating an example computing device that is arranged for determining properties of fluids in accordance with at least some embodiments described herein.
Figure 12:
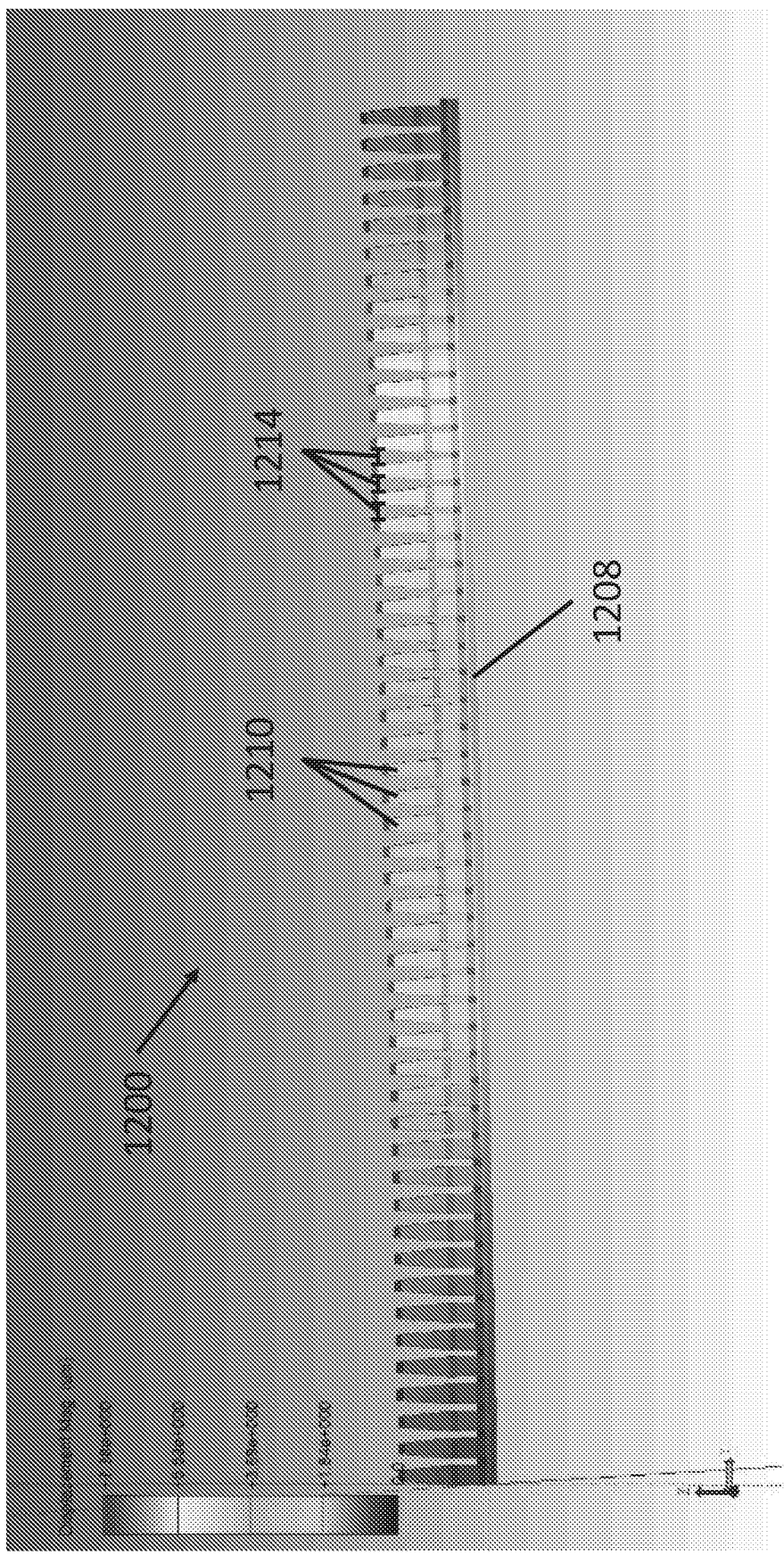
FIG. 12 is a block diagram depicting a cantilever fluctuating gap depletion force measurement device in accordance with at least some embodiments described herein, all arranged in accordance with at least some embodiments of the present disclosure.

FIG. 12 is a block diagram depicting a cantilever fluctuating gap depletion force measurement device in accordance with at least some embodiments described herein. The device 1200 includes a flexible sensor 1208 and a plurality of fluctuating elements 1210 which are separated from each other by gaps 1214. The various components described in FIG. 11 are merely examples, and other variations, including eliminating components, combining components, and substituting components are all contemplated.

The device 1200 may be an implemented in the device 100 of FIG. 1. The device 1200 may have fluctuating gaps 1214 similar to the gaps 1014 of FIG. 10, except that in the device 1200 there is no stationary mass, as each pair of fluctuating elements 1210 form a gap 1214 between them. The device 1200 has a plurality of fluctuating elements 1210 and a plurality of gaps 1214 between them, such that the effects of the depletion forces acting on each pair of fluctuating elements 1210 may be additive. This may yield a larger response to the depletion forces which may be easier to measure.

The device 1200 includes a flexible sensor 1208, which may be immersed in a test fluid (e.g., by being positioned in the well 102 of FIG. 1). The flexible sensor 1208 may be made of a material which can deform (e.g., bend) in one or more directions. The flexible sensor 1208 has a plurality of fluctuating elements 1210 positioned along it. Each of the fluctuating elements 1210 may be separated from adjacent fluctuating elements 1210 by a gap 1214. The gaps 1214 may have a nominal spacing, which may change as the flexible sensor 1208 deforms. The deformation of the flexible sensor 1208 may change the size of multiple of the gaps 1214. As the size of the gaps 1214 changes, the effects of the depletion force acting on each pair of fluctuating elements 1210 may change, which in turn may affect the deformation of the flexible sensor 1210. Accordingly, the deformation of the flexible sensor 1208 may be measured and those measurements may be used to characterize the test fluid (and particles therein).

As shown in the example embodiment of FIG. 12, the flexible sensor 1208 and fluctuating elements 1210 may generally be 'comb' shaped, with the flexible sensor 1208 forming a generally linear element with the fluctuating elements 1210 positioned generally perpendicular to the long axis of the flexible sensor 1208. The flexible sensor 1208 may bend or curl towards the fluctuating elements 1210 (e.g., 'up' as illustrated in FIG. 12). The flexible sensor 1208 may be biased towards an uncurled position (e.g., straight) and may curl due to random fluctuations and/or be induced to curl (e.g., by a current in the test fluid). As the flexible sensor 1208 curls upwards, the size of the gaps 1214 between the fluctuating elements 1210 may generally decrease. Depletion forces acting on pairs of the fluctuating elements 1210 may act to counter the tendency of the flexible sensor 1208 to uncurl. Since the force acting against the curl may be the sum of the depletion forces acting on each pair of fluctuating elements 1210, the overall force may be greater (and thus easier to measure) than if the forces on each gap 1214 needed to be measured individually.

The flexible sensor 1208 may be a cantilever, which is fixed on one end (e.g., the left side as illustrated) and free to move on the other end. The flexible sensor 1208 may be made of a soft and/or elastic material such as silicone rubber (PDMS). The flexible sensor 1208 may be made of a pure material or a composite. Example composites may include nanotube and/or nanowire composites. The composites may add additional functionality, which may include piezoresistive properties, enhanced optical properties (e.g., reflectivity), modifying the elastic behavior, and/or other changes to the properties of the pure material.

In some embodiments, the flexible sensor 1208 may include one or more elements which measures the overall curve of the flexible sensor 1208. The fixed end of the flexible sensor 1208 may include couplings (e.g., electrical connections) which may link the measuring elements to the system (e.g., computing system 118 of FIG. 1). For example, the curvature may be measured with piezoresistance (e.g., by depositing a piezoresistive material onto the base of flexible sensor 1208 and/or by fabricating the entire flexible sensor 1208 from piezoresistive material), the piezo electric effect, capacitance, or combinations thereof. In some embodiments, the curve of the flexible sensor 1208 may be measured by one or more components external to the device 1200. For example, microscopy, optics, magnetic means, and/or other techniques may measure the curvature of the flexible sensor 1208.

The fluctuating elements 1210 may be generally positioned such that they have regular spacing and are positioned along one side of the flexible sensor 1208. In one example embodiment, the flexible sensor 1208 may be 150 μm long, and the fluctuating elements 1210 may be spaced apart (when the flexible sensor 1208 is uncurled) by 1 μm. The fluctuating elements 1210 may be made of the same material as the flexible sensor 1208, or may be made of one or more different materials. In some embodiments, the fluctuating elements 1210 may be made of a stiffer material than the flexible sensor 1210.

In some embodiments, the device 1200 may be a unitary body, with the flexible sensor 1208 and the fluctuating elements 1210 formed from a single piece of material. For example the device 1200 may be made from an elastomer using soft lithography. A mold may be made (e.g., on a silicon wafer via micromachining) and the elastomer may be poured into the mold and cured. In other embodiments, the device 1200 may be fabricated from MEMS materials such as polysilicon using standard MEMS processes like SUMMIT or MUMPS, or with top-down nanofabrication methods like ebeam lithography, focused ion beam (FIB), reactive ion etching (RIE), plasma etching, chemical wet etching, or combinations thereof.

In an example operation, a fluid may be flowed across the device 1200 (e.g., generally upwards as illustrated). The flexible sensor 1208 may curl upwards, which may bring the tips of the fluctuating elements 1210 closer together, reducing the size of the gaps 1214. The depletion force(s) may be determined my monitoring the curvature of the flexible sensor 1208 over time. For example, if the fluid flow is stopped, the flexible sensor 1208 may begin to uncurl. The time it takes for the flexible sensor 1208 to uncurl may be determined, at least in part, by the depletion forces acting to reduce the size of the gaps 1214.

FIG. 11 is a block diagram illustrating an example computing device that is arranged for determining properties of fluids in accordance with at least some embodiments described herein. In a very basic configuration 1101, computing device 1100 typically includes one or more processors 1110 and system memory 1120. A memory bus 1130 may be used for communicating between the processor 1110 and the system memory 1120.

Depending on the desired configuration, processor 1110 may be of any type including but not limited to a microprocessor (μP), a microcontroller (μC), a digital signal processor (DSP), or any combination thereof. Processor 1110 may include one more levels of caching, such as a level one cache 1111 and a level two cache 1112, a processor core 1113, and registers 1114. An example processor core 1113 may include an arithmetic logic unit (ALU), a floating point unit (FPU), a digital signal processing core (DSP Core), or any combination thereof. An example memory controller 1115 may also be used with the processor 1110, or in some implementations, the memory controller 1115 may be an internal part of the processor 1110.

Depending on the desired configuration, the system memory 1120 may be of any type including but not limited to volatile memory (such as RAM), non-volatile memory (such as ROM, flash memory, etc.) or any combination thereof. System memory 1120 may include an operating system 1121, one or more applications 1122, and program data 1124. Application 1122 may include a measurement procedure 1123 that is arranged to determine a property of a fluid using depletion force sensors as described herein. Program data 1124 may include machine learning models, sensor data, mathematical relationships, physical constants, known or expected properties of the fluid, and/or other information useful for the implementation of fluid property detection based on depletion force sensing. In some embodiments, application 1122 may be arranged to operate with program data 1124 on an operating system 1121 such that any of the procedures described herein may be performed. This described basic configuration is illustrated in FIG. 7 by those components depicted within the dashed line of the basic configuration 1101.

Computing device 1100 may have additional features or functionality, and additional interfaces to facilitate communications between the basic configuration 1101 and any required devices and interfaces. For example, a bus/interface controller 1140 may be used to facilitate communications between the basic configuration 1101 and one or more storage devices 1150 via a storage interface bus 1141. The storage devices 1150 may be removable storage devices 1151, non-removable storage devices 1152, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Examples of computer storage media may include volatile and nonvolatile, removable and non-removable media implemented in any method or technology for storage of information, such as computer readable instructions, data structures, program modules, or other data.

System memory 1120, removable storage 1151 and non-removable storage 1152 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 1100. Any such computer storage media may be part of computing device 1100.

Computing device 1100 may also include an interface bus 1142 for facilitating communication from various interface devices (e.g., output interfaces, peripheral interfaces, and communication interfaces) to the basic configuration 1101 via the bus/interface controller 1140. Example output devices 1160 include a graphics processing unit 1161 and an audio processing unit 1162, which may be configured to communicate to various external devices such as a display or speakers via one or more A/V ports 1163. Example peripheral interfaces 1170 include a serial interface controller 1171 or a parallel interface controller 1172, which may be configured to communicate with external devices such as input devices (e.g., keyboard, mouse, pen, voice input device, touch input device, etc.) or other peripheral devices (e.g., printer, scanner, etc.) via one or more I/O ports 1173. An example communication device 1180 includes a network controller 1181, which may be arranged to facilitate communications with one or more other computing devices 1100 over a network communication link via one or more communication ports 1182.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 1100 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 700 may also be implemented as a personal computer including both laptop computer and non-laptop computer configurations.

The present disclosure is not to be limited in terms of the particular examples described in this application, which are intended as illustrations of various aspects. Many modifications and examples can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and examples are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular examples only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 items refers to groups having 1, 2, or 3 items. Similarly, a group having 1-5 items refers to groups having 1, 2, 3, 4, or 5 items, and so forth.

While the foregoing detailed description has set forth various examples of the devices and/or processes via the use of block diagrams, flowcharts, and/or examples, such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one example, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the examples disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. For example, if a user determines that speed and accuracy are paramount, the user may opt for a mainly hardware and/or firmware vehicle; if flexibility is paramount, the user may opt for a mainly software implementation; or, yet again alternatively, the user may opt for some combination of hardware, software, and/or firmware.

In addition, those skilled in the art will appreciate that the mechanisms of the subject matter described herein are capable of being distributed as a program product in a variety of forms, and that an illustrative example of the subject matter described herein applies regardless of the particular type of signal bearing medium used to actually carry out the distribution. Examples of a signal bearing medium include, but are not limited to, the following: a recordable type medium such as a floppy disk, a hard disk drive (HDD), a Compact Disc (CD), a Digital Video Disk (DVD), a digital tape, a computer memory, etc.; and a transmission type medium such as a digital and/or an analog communication medium (e.g., a fiber optic cable, a waveguide, a wired communication link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While various aspects and examples have been disclosed herein, other aspects and examples will be apparent to those skilled in the art. The various aspects and examples disclosed herein are for purposes of illustration and are not intended to be limiting, with the true scope and spirit being indicated by the following claims.

What is claimed is:

1. A microfabricated system comprising:
   a well configured to contain a test fluid;
   a mass having a surface, wherein the surface is configured to be immersed in the test fluid during operation;
   a sensor comprising a sense element configured to be immersed in the test fluid during operation, the sense element comprising a sensor face separated from the surface of the mass by a gap, wherein the sensor is configured to measure force on the sense element relative to the mass; and a processor coupled to the sensor and configured to determine properties of the test fluid based on the measured force from the sensor.

2. The system of claim 1, wherein the test fluid comprises particles, and wherein the processor is configured to determine the properties of the test fluid as at least one of a size of the particles, a concentration of the particles, and/or a size distribution of the particles based on the measured force from the sensor.

3. The system of claim 1, wherein at least a portion of the sensor is positioned in the fluid.

4. The system of claim 1, wherein the mass comprises a wall.

5. The system of claim 1, wherein the mass is coupled to an actuator configured to selectively vary a size of the gap.

6. The system of claim 1, wherein the sense element is coupled to an actuator configured to selectively vary the size of the gap.

7. The system of claim 1, further comprising a reference sensor comprising a reference tip positioned in the test fluid away from the mass, the reference sensor configured to measure force on the reference tip.

8. The system of claim 7, wherein the processor is coupled to the reference sensor and further configured to determine the properties of the test fluid based on a comparison of the measured force on the sense element and the measured force on the reference tip.

9. The system of claim 1, wherein the mass is coupled to a second sensor configured to measure force on the mass toward the sensor face, and wherein the processor is configured to determine the properties of the test fluid based on the measured force on the sense element and the measured force on the mass.

10. The system of claim 1, wherein the processor is configured to use machine learning to determine characteristics of the test fluid, of particles in the test fluid, or both.

11. The system of claim 1, wherein the sensor comprises a plurality of sensor tips positioned in the test fluid, each of the sensor tips positioned at a different distance from the surface of the mass, wherein the sensor is configured to measure a force on each of the sensor tips, and wherein the processor is configured to determine the properties of the test fluid based on the measured force on each of the sensor tips.

12. A device comprising:
a well configured to hold a test fluid;
a mass partially positioned in the well, the mass comprising a surface configured for contact with the test fluid;
a sense element having a sensor face which is positioned a distance from the surface; an actuator positioned outside the well, the actuator coupled to a portion of the mass positioned outside of the well, the actuator configured to move the mass to change the distance between the sensor face and the surface of the mass; and a sensor positioned outside the well, the sensor coupled to the sense element to measure force on the sensor face exerted towards the surface of the mass.

13. The device of claim 12, wherein a displacement of the mass along the axis provides a change in a distance between the sensor face and the surface, wherein the displacement of the mass is greater than the change in the distance.

14. The device of claim 12, wherein the mass is wedge shaped such that the actuator moves the mass along an axis other than parallel to the surface of the mass.

15. The device of claim 12, wherein the sensor and the actuator are positioned in a fluid which is immiscible with the test fluid.

16. The device of claim 12, wherein the actuator comprises an electrostatic comb drive.

17. A method comprising:
immersing at least a portion of a mass and at least a portion of a sense element in a test fluid, wherein immersed portions of the mass and the sense element are separated by a gap;
measuring, with the sense element, force on the sense element relative to the mass; and determining, using at least one processing unit, properties of the test fluid based on the measured force.

18. The method of claim 17, further comprising measuring force on a reference tip which is positioned in the test fluid away from the mass, wherein determining the properties of the test fluid is based on the measured force of the sense element and the measured force on the reference sensor.

19. The method of claim 17, further comprising varying a size of the gap and measuring force on the sense element relative to the mass at different sizes of the gap, wherein determining the properties of the test fluid is based on the measurements at the different sizes of the gap.

20. The method of claim 17, wherein determining the properties of the test fluid includes using machine learning to determine a concentration of particles in the test fluid, a size of the particles or both.

21. The method of claim 17, wherein determining the properties of the test fluid comprises determining at least one of a size of particles in the test fluid, a concentration of the particles in the test fluid, and/or a size distribution of the particles in the test fluid.

* * * * *